United States Patent
Day-Richter et al.

(10) Patent No.: US 9,336,137 B2
(45) Date of Patent: May 10, 2016

(54) SYSTEM AND METHOD FOR PERFORMING DATA MANAGEMENT IN A COLLABORATIVE DEVELOPMENT ENVIRONMENT

(75) Inventors: John Day-Richter, Denver, CO (US); John McGowan, Tuscon, AZ (US)

(73) Assignee: Google Inc., Mountain View, CA (US)

( * ) Notice: Subject to any disclaimer, the term of this patent is extended or adjusted under 35 U.S.C. 154(b) by 776 days.

(21) Appl. No.: 13/591,734

(22) Filed: Aug. 22, 2012

(65) Prior Publication Data

US 2015/0199270 A1 Jul. 16, 2015

Related U.S. Application Data

(63) Continuation-in-part of application No. 13/224,479, filed on Sep. 2, 2011, now abandoned.

(51) Int. Cl.
| | |
|---|---|
| *G06F 17/00* | (2006.01) |
| *G06F 12/02* | (2006.01) |
| *G06F 9/00* | (2006.01) |
| G06F 17/30 | (2006.01) |
| G06F 17/24 | (2006.01) |

(52) U.S. Cl.
CPC .............. *G06F 12/0253* (2013.01); *G06F 9/00* (2013.01); *G06F 17/30* (2013.01); *G06F 17/24* (2013.01); *G06F 17/30312* (2013.01)

(58) Field of Classification Search
CPC ............................ G06F 17/24; G06F 17/30312
See application file for complete search history.

(56) References Cited

U.S. PATENT DOCUMENTS

| | | |
|---|---|---|
| 5,528,743 A | 6/1996 | Tou et al. |
| 5,758,358 A | 5/1998 | Ebbo |
| 5,761,669 A | 6/1998 | Montague et al. |
| 5,793,966 A | 8/1998 | Amstein et al. |
| 5,895,476 A | 4/1999 | Orr et al. |
| 5,930,813 A | 7/1999 | Padgett et al. |
| 6,006,239 A | 12/1999 | Bhansali et al. |
| 6,049,239 A | 4/2000 | Eto et al. |
| 6,169,999 B1 | 1/2001 | Kanno |
| 6,243,706 B1 | 6/2001 | Moreau et al. |
| 6,275,223 B1 | 8/2001 | Hughes |
| 6,327,584 B1 | 12/2001 | Xian et al. |
| 6,341,305 B2 | 1/2002 | Wolfe |
| 6,377,354 B1 | 4/2002 | Nguyen et al. |
| 6,418,441 B1 | 7/2002 | Call |
| 6,501,779 B1 | 12/2002 | McLaughlin et al. |
| 6,512,531 B1 | 1/2003 | Gartland |
| 6,662,210 B1 | 12/2003 | Schwartz et al. |

(Continued)

OTHER PUBLICATIONS

Undo Any Operation at Any Time in Group Editors, C.Sun, 2000, 2000 ACM conference on Computer supported cooperative work, pp. 191-200.*

(Continued)

*Primary Examiner* — Andrew McIntosh
(74) *Attorney, Agent, or Firm* — Ropes & Gray LLP

(57) ABSTRACT

An object that is not linked to a root object of a data model is identified. A first instruction comprising a fingerprint and a request to delete the object from memory is transmitted to a plurality of user devices. A second instruction to undo the first instruction is received from one of the plurality of user devices, and, in response to the second instruction, a third instruction comprising the fingerprint and a request to execute and delete any instruction that includes the fingerprint is transmitted to the plurality of user devices.

8 Claims, 29 Drawing Sheets

(56) References Cited

U.S. PATENT DOCUMENTS

| | | |
|---|---|---|
| 6,717,593 B1 | 4/2004 | Jennings |
| 6,879,997 B1 | 4/2005 | Ketola et al. |
| 6,972,748 B1 | 12/2005 | Lang |
| 6,983,316 B1 | 1/2006 | Milne et al. |
| 7,009,626 B2 | 3/2006 | Anwar |
| 7,031,954 B1 | 4/2006 | Kirsch |
| 7,035,910 B1 | 4/2006 | Dutta et al. |
| 7,039,643 B2 | 5/2006 | Sena et al. |
| 7,231,597 B1 | 6/2007 | Braun et al. |
| 7,287,094 B2 | 10/2007 | Mogul |
| 7,437,421 B2 | 10/2008 | Bhogal et al. |
| 7,478,330 B1 | 1/2009 | Branson et al. |
| 7,487,448 B2 | 2/2009 | Emerson et al. |
| 7,491,399 B2 | 2/2009 | Vakharia |
| 7,519,630 B2 | 4/2009 | Brown et al. |
| 7,519,953 B2 | 4/2009 | Reissman et al. |
| 7,529,778 B1 | 5/2009 | Dewey et al. |
| 7,624,145 B2 | 11/2009 | Junuzovic et al. |
| 7,656,543 B2 | 2/2010 | Atkins |
| 7,665,068 B2 | 2/2010 | Neumann et al. |
| 7,680,932 B2 | 3/2010 | Defaix et al. |
| 7,698,379 B2 | 4/2010 | Dutta et al. |
| 7,712,016 B2 | 5/2010 | Jones et al. |
| 7,774,703 B2 | 8/2010 | Junuzovic et al. |
| 7,788,647 B2 | 8/2010 | Martin et al. |
| 7,792,788 B2 | 9/2010 | Melmon et al. |
| 7,836,148 B2 | 11/2010 | Popp et al. |
| 7,890,928 B2 | 2/2011 | Patrudu |
| 7,904,515 B2 | 3/2011 | Ambati et al. |
| 7,917,554 B2 | 3/2011 | Hull et al. |
| 7,920,894 B2 | 4/2011 | Wyler |
| 7,950,004 B2 | 5/2011 | Vieira et al. |
| 7,953,696 B2 | 5/2011 | Davis et al. |
| 7,958,448 B2 | 6/2011 | Fattic, II et al. |
| 7,983,416 B2 | 7/2011 | Takashima et al. |
| 7,984,426 B2 | 7/2011 | Loff |
| 8,001,606 B1 | 8/2011 | Spertus |
| 8,019,780 B1 | 9/2011 | Pinkerton et al. |
| 8,020,001 B2 | 9/2011 | Lundblade et al. |
| 8,044,961 B2 | 10/2011 | Opstad et al. |
| 8,065,604 B2 | 11/2011 | Blankinship |
| 8,073,812 B2 | 12/2011 | Curtis |
| 8,234,620 B1 | 7/2012 | Bychkov et al. |
| 8,327,127 B2 | 12/2012 | Suryanarayana et al. |
| 8,395,733 B2 | 3/2013 | Ataka et al. |
| 8,516,446 B2 | 8/2013 | Williams et al. |
| 2002/0032701 A1 | 3/2002 | Gao et al. |
| 2002/0035580 A1 | 3/2002 | Tanabe |
| 2002/0133492 A1 | 9/2002 | Goldstein et al. |
| 2002/0174085 A1 | 11/2002 | Nelson et al. |
| 2003/0037076 A1 | 2/2003 | Bravery et al. |
| 2003/0037303 A1 | 2/2003 | Bodlaender et al. |
| 2003/0061349 A1 | 3/2003 | Lo et al. |
| 2003/0084078 A1 | 5/2003 | Torii et al. |
| 2003/0115268 A1 | 6/2003 | Esposito |
| 2003/0179230 A1 | 9/2003 | Seidman |
| 2004/0015781 A1 | 1/2004 | Brown et al. |
| 2004/0044965 A1 | 3/2004 | Toyama et al. |
| 2004/0085354 A1 | 5/2004 | Massand |
| 2004/0088374 A1 | 5/2004 | Webb et al. |
| 2004/0088653 A1 | 5/2004 | Bell et al. |
| 2004/0133444 A1 | 7/2004 | Defaix et al. |
| 2004/0215672 A1 | 10/2004 | Pfitzner |
| 2004/0215825 A1 | 10/2004 | Pfitzner |
| 2004/0215826 A1 | 10/2004 | Pfitzner |
| 2004/0216090 A1 | 10/2004 | Kaler et al. |
| 2005/0066307 A1 | 3/2005 | Patel et al. |
| 2005/0071818 A1 | 3/2005 | Reissman et al. |
| 2005/0091291 A1 | 4/2005 | Kaler et al. |
| 2005/0125461 A1 | 6/2005 | Filz |
| 2005/0131887 A1 | 6/2005 | Rohrabaugh et al. |
| 2005/0132333 A1 | 6/2005 | Neumann et al. |
| 2005/0185636 A1 | 8/2005 | Bucher |
| 2005/0200896 A1 | 9/2005 | Narusawa et al. |
| 2005/0234943 A1 | 10/2005 | Clarke |
| 2006/0031751 A1 | 2/2006 | Ehud |
| 2006/0075332 A1 | 4/2006 | Fairweather et al. |
| 2006/0101071 A1 | 5/2006 | Henderson |
| 2006/0200755 A1 | 9/2006 | Melmon et al. |
| 2006/0230344 A1 | 10/2006 | Jennings et al. |
| 2006/0248121 A1 | 11/2006 | Cacenco et al. |
| 2007/0033654 A1 | 2/2007 | Wilson |
| 2007/0061714 A1 | 3/2007 | Stuple et al. |
| 2007/0070066 A1 | 3/2007 | Bakhash |
| 2007/0073899 A1 | 3/2007 | Judge et al. |
| 2007/0094601 A1 | 4/2007 | Greenberg et al. |
| 2007/0186157 A1 | 8/2007 | Walker et al. |
| 2007/0208992 A1 | 9/2007 | Koren |
| 2007/0220068 A1 | 9/2007 | Thompson et al. |
| 2007/0220342 A1 | 9/2007 | Vieira et al. |
| 2007/0233811 A1 | 10/2007 | Rochelle et al. |
| 2007/0239695 A1 | 10/2007 | Chakra et al. |
| 2007/0288637 A1 | 12/2007 | Layton et al. |
| 2007/0299857 A1 | 12/2007 | Gwozdz et al. |
| 2008/0028302 A1 | 1/2008 | Meschkat |
| 2008/0040659 A1 | 2/2008 | Doyle |
| 2008/0052690 A1 | 2/2008 | Bharadwaj |
| 2008/0059539 A1 | 3/2008 | Chin et al. |
| 2008/0082604 A1 | 4/2008 | Mansour et al. |
| 2008/0083031 A1 | 4/2008 | Meijer et al. |
| 2008/0126943 A1 | 5/2008 | Parasnis et al. |
| 2008/0133563 A1* | 6/2008 | Hironiwa ............... 707/101 |
| 2008/0178073 A1* | 7/2008 | Gao et al. ............... 715/243 |
| 2009/0112990 A1 | 4/2009 | Campbell et al. |
| 2009/0177703 A1* | 7/2009 | Cuneo et al. ............... 707/200 |
| 2009/0187894 A1 | 7/2009 | Bell et al. |
| 2009/0192845 A1 | 7/2009 | Gudipaty et al. |
| 2009/0235181 A1 | 9/2009 | Saliba et al. |
| 2010/0030578 A1 | 2/2010 | Siddique et al. |
| 2010/0042974 A1 | 2/2010 | Gutz et al. |
| 2010/0058468 A1 | 3/2010 | Green et al. |
| 2010/0083096 A1 | 4/2010 | Dupuis-Latour et al. |
| 2010/0153948 A1 | 6/2010 | Schreiber et al. |
| 2010/0211772 A1 | 8/2010 | Johansson et al. |
| 2010/0218099 A1 | 8/2010 | van Melle et al. |
| 2010/0235763 A1 | 9/2010 | Massand |
| 2010/0241749 A1 | 9/2010 | Rasmussen et al. |
| 2010/0245256 A1 | 9/2010 | Estrada et al. |
| 2010/0251122 A1 | 9/2010 | Lee et al. |
| 2010/0257517 A1 | 10/2010 | Sriram et al. |
| 2011/0066957 A1 | 3/2011 | Prats et al. |
| 2011/0082684 A1 | 4/2011 | Soricut et al. |
| 2011/0085211 A1 | 4/2011 | King et al. |
| 2011/0178981 A1 | 7/2011 | Bowen et al. |
| 2011/0239195 A1 | 9/2011 | Lin et al. |
| 2011/0302237 A1 | 12/2011 | Knight et al. |
| 2011/0313820 A1 | 12/2011 | Biewald et al. |
| 2012/0023129 A1* | 1/2012 | Vedula et al. ............... 707/769 |
| 2012/0072819 A1 | 3/2012 | Lindner |
| 2012/0096516 A1 | 4/2012 | Sobel et al. |
| 2012/0246616 A1 | 9/2012 | Frontiero et al. |
| 2013/0097659 A1 | 4/2013 | Das et al. |
| 2013/0198606 A1 | 8/2013 | Farrell et al. |

OTHER PUBLICATIONS

Undo as Concurrent Inverse in Group Editors, C. Sun, 2002, ACM Transactions on Computer-Human Interaction, vol. 9; No. 4, Dec. 2002, pp. 309-361.*
Scalable XML Collaborative Editing With Undo, Martin et al., 2010, OTM 2010, Part I, LNCS 6426, pp. 507-514, 2010.*
Unpublished U.S. Appl. No. 13/006,259, filed Jan. 13, 2011.
Unpublished U.S. Appl. No. 13/166,844, filed Jun. 23, 2011.
Unpublished U.S. Appl. No. 13/224,479, filed Sep. 2, 2011.
Unpublished U.S. Appl. No. 13/224,530, filed Sep. 2, 2011.
Unpublished U.S. Appl. No. 13/224,573, filed Sep. 2, 2011.
Unpublished U.S. Appl. No. 13/224,663, filed Sep. 2, 2011.
Unpublished U.S. Appl. No. 13/224,769, filed Sep. 2, 2011.
Unpublished U.S. Appl. No. 13/224,860, filed Sep. 2, 2011.
Unpublished U.S. Appl. No. 13/297,762, filed Nov. 16, 2011.
Unpublished U.S. Appl. No. 13/274,382, filed Oct. 17, 2011.
Unpublished U.S. Appl. No. 13/282,636, filed Oct. 17, 2011.
Unpublished U.S. Appl. No. 13/282,753, filed Oct. 27, 2011.

(56) References Cited

OTHER PUBLICATIONS

Unpublished U.S. Appl. No. 13/493,798, filed Jun. 11, 2012.
Unpublished U.S. Appl. No. 13/493,672, filed Jun. 11, 2012.
Unpublished U.S. Appl. No. 13/551,859, filed Jul. 18, 2012.
Unpublished U.S. Appl. No. 13/551,772, filed Jul. 18, 2012.
Unpublished U.S. Appl. No. 13/591,851, filed Aug. 22, 2012.
Citro, Sandy, "Conflict Management for Real-Time Collaborative Editing in Mobile Replicated Architectures," 2007, Australian Computer Society, Inc., Thirteenth Austrailian Computer Science Conference (ACSC2007), pp. 115-124.
DeJean, David, "Online office apps get real: Google Docs vs. ThinkFree vs. Zoho, Web-based suites have become real challengers to desktop applications," Jul. 16, 2008, Computerworld [online]. Retrieved from the Internet: <URL: http://www.computerworld.com/s/article/print/9108799/Online_office_apps_get_real_Google_Docs_vs_ThinkFree_vs._Zoho> (7 pp.).
Miller, Michael, "Googlepedia: The Ultimate Google Resource, Third edition," 2008, p. 276.
Olav Junker Kjaer, "Timing and Synchronization in JavaScript", Dev. Opera, Sections: "The Basics", "Event Queing", "Long Running Scripts" and "Advice on Timing", Feb. 27, 2007, downloaded from URL: htt//dev.opera.com/articles/view/timing-and-synchronization-in-javascript/, pp. 1-9.
PCT International Search Report corresponding to PCT Application No. PCT/US2011/001417 filed Aug. 11, 2011 (2 pages).
PCT Written Opinion of the International Searching Authority corresponding to PCT Application No. PCT/US2011/001417 filed Aug. 11, 2011 (7 pages).
Quinn, Laura S., "Comparing Online vs. Traditional Office Software, Will desktop or online office software fit your non-profit needs best?" May 21, 2010, courtesy of Idealware, TechSoup.org [online]. Retrieved from the Internet URL:http://www.techsoup.org/learningcenter/software/page11852.cfm (4 pp.).
Tyson, Herb, "Microsoft Word 2007 Bible," 2007, 112-115, 467, 523-525, 798.
Wikipedia, the free encyclopedia, "Model-View-Controller," last modified on Nov. 16, 2010 [online]. Retrieved from the Internet: URL:http://en.wikipedia.org/wiki/Model%E2%80%93view%E2%80%93controller (10 pp.).
Sun, "Operational Transformation in Real-Time Group Editors: Issues, Algorithms, and Achievements," Conference on Computer-Supported Cooperative Work, 1988.
Googlepedia: The Ultimate Google Resource, Third Edition, 2008.
Conner, Zoho 4 Everyone, 2008.
Bibi et al., "A Platform for Delivering Multimedia Presentations on Cultural Heritage," 2010 14th Panhellenic Conference on Informatics, 5 pages.
Cayenne-McCall, "Synchronous 3D Document Collaboration," Pace University, Department of Computer Sciene, Nov. 2008 (42 pages).
Coulson, "A generic Component Model for Building Systems Software", ACM Transactions on Computer Systems, 26(1), Article 1 (Feb. 2008), 42 pages.
Ding, "The Dependency Management Framework: A Case Study of the ION CubeSat", 2006 IEEE; 10 pages; <http://ieeexplore.ieee.org/stamp/stamp.jsp?tp=&arnumber=1647725>.
Ellis et al., "Concurrency Control in Groupware Systems," ACM 1989, pp. 399-407.
Ellis et al., "Groupware Some Issues and Experiences", Communications of the Association for Computing Machinery, 34(1), Jan. 1991, pp. 38-58.
Guo, "A Coordination Framework for Software Component Based Development", 2006 IEEE; 8 pages; <http://ieeexplore.ieee.org/stamp/stamp.jsp?tp=&arnumber=4020089>.
Hodel et al., "Supporting Collaborative Layouting in Word Processing," University of Zurich, Department of Inforamtics; Zurich, Switzerland, 2004 (18 pages).
Holzer, "Google Docs 4 Everyone" http://www.scribd.com/doc/14119795/Google-Docs-4-Everyone Published Feb. 2009, 55 pages.
Huang et al., "A General Purpose Virtual Collaboration Room," Google 1999, pp. 1-9.
Ignat et al., "Awareness of Concurrent Changes in Distributed Software Development," Nancy-Universite, France, 2008 (9 pages).
Ignat et al., "CoDoc: Multi-mode Collaboration over Documents," ETII Surich, Institute for Information Systems; Zurich, Switzerland, 2004 (15 pages).
Nasir et al., "Collaborative Report Creation System for Industrial Use," Yamagata University, Graduate School of Science and Enqineerinq; Yamagata, Japan, 2009 (6 pages).
Ommering, "Building Product Populations with Software Components," 2002 ACM; pp. 255-265; <http://dlacm.org/citation.cfm?id=581373>.
Pacull et al., "Duplex: A Distributed Collaborative Editing Environment in Large Scale," ACM 1994, pp. 165-173.
Prakash, "A Framework for Undoing Actions in Collaborative Systems", ACM Transactions on Computer-Human Interaction, vol. 1, No. 4, Dec. 1994, renumbered pp. 1-36.
Raman, "Cloud Computing and Equal Access for All," Google Inc., 2008 (4 pages).
Shen et al., "Flexible Merging for Asynchronous Collaborative Systems," Griffith University, School of Computing an Information Technology, Brisbane, Australia, 2002 (18 pages).
Shen et al., "Integrating Advanced Collaborative Capabilitites into Web-Based Word Processors," Nauyang Technological University, School of Computer Engineering, Singapore, 2007 (8 pages).
Szyperski, Component Technology—What, Where, and How; 2003 IEEE; pp. 684-693; <http://dl.acm.org/citation.cfm?id=776916>.
Using Adobe Buzzword, 2008, pp. 1-35.
Wang et al., "Google Wave Operational Transformation", Jul. 1, 2010, pp. 1-7, retrieved from the Internet Jan. 23, 2013: http://wave-protocol.googlecode.comfhg/Whitepapers/operational-transform/operational-transform.html.
Wikipeda, "Operational Transformation," http://en.wikipedia.org/wiki/Operational_transformation, retrieved on Jan. 23, 2013, page last modified on Jan. 16, 2013, 14 pages.
Yacoub, Scenario-Based Reliability Analysis of Component-Based Software; 1999 IEEE; 10 pages; <http://ieeexplore.ieee.org/stamp/stamp.jsp?tp=&arnumber=809307>.

* cited by examiner

| | 434 | 436 | 438 |
|---|---|---|---|
| | Date/Time of Activity | User Name | Activity Information |
| 451 | MM/DD/YYYY 12:01:01 | User 1 | Activity 1 |
| 452 | MM/DD/YYYY 12:03:05 | User 2 | Activity 2 |

428

591

File

424 — helloworld

SYSTEM AND METHOD FOR PERFORMING DATA MANAGEMENT IN A COLLABORATIVE DEVELOPMENT ENVIRONMENT

This application is a continuation-in-part of U.S. patent application Ser. No. 13/224,479 filed Sep. 2, 2011, which is incorporated by reference herein in its entirety. This application is related to U.S. patent application Ser. No. 13/224,530 filed Sep. 2, 2011; U.S. patent application Ser. No. 13/224,573 filed Sep. 2, 2011; U.S. patent application Ser. No. 13/224,663 filed Sep. 2, 2011; U.S. patent application Ser. No. 13/224,769 filed Sep. 2, 2011; U.S. patent application Ser. No. 13/224,860 filed Sep. 2, 2011, U.S. patent application Ser. No. 13/551,772 filed Jul. 18, 2012; U.S. patent application Ser. No. 13/551,859 filed Jul. 18, 2012; and U.S. patent application Ser. No. 13/591,851 filed Aug. 22, 2012 which are incorporated by reference herein in their entirety.

TECHNICAL FIELD

This specification relates generally to systems and methods for performing data management functions, and more particularly to systems and methods for performing data management functions in a collaborative development environment.

BACKGROUND

Data storage has become an increasingly important component of computer networking technologies. One challenge related to data storage involves the identification and cleanup of data that is no longer being used. Many data storage systems perform this function, also referred to as "garbage collection," as a background routine to ensure the continual availability of memory space for needed operations. For example, a background garbage collection routine may remove unused data from a device's temporary memory. However, data that is eliminated from memory through garbage collection is typically lost and cannot be recovered by the end user. Therefore, there exists a need for methods and systems for performing a garbage collection function to remove unused data while also offering a capability to recover data that is removed.

SUMMARY

In accordance with an embodiment, an object that is not linked to a root object of a data model is identified. A first instruction comprising a fingerprint and a request to delete the object from memory is transmitted to a plurality of user devices. A second instruction to undo the first instruction is received from one of the plurality of user devices, and, in response to the second instruction, a third instruction comprising the fingerprint and a request to execute and delete any instruction that includes the fingerprint is transmitted to the plurality of user devices.

In an embodiment, the object is deleted from the data model. In another embodiment, the identifying step and the transmitting step are performed while performing a background garbage collection function. In another embodiment, the fingerprint is generated.

In accordance with another embodiment, a delete instruction to delete specified data from memory is received by a user device. The specified data is deleted from memory in response to the delete instruction, and a first reverse instruction corresponding to the delete instruction is stored in a stack data structure. An undo instruction to restore the specified data in memory is received, and the first reverse instruction, and a second reverse instruction stored in the stack data structure subsequent to the first reverse instruction, are executed in response to the undo instruction. The first reverse instruction may include information that enables the user device to restore the data that was deleted by the delete instruction.

In another embodiment, a second delete instruction to delete second specified data from memory is received. The second specified data is deleted from memory, and the second reverse instruction corresponding to the second instruction is stored in the stack.

In one embodiment, the delete instruction further comprises a fingerprint associated with the delete instruction. A message comprising the fingerprint associated with the delete instruction and a request to delete any reverse instruction comprising the fingerprint are transmitted to a second user device.

In one embodiment, the second reverse instruction and the first reverse instruction are deleted from the stack data structure in response to the undo instruction.

These and other advantages of the present disclosure will be apparent to those of ordinary skill in the art by reference to the following Detailed Description and the accompanying drawings.

DETAILED DESCRIPTION

Figure 1:
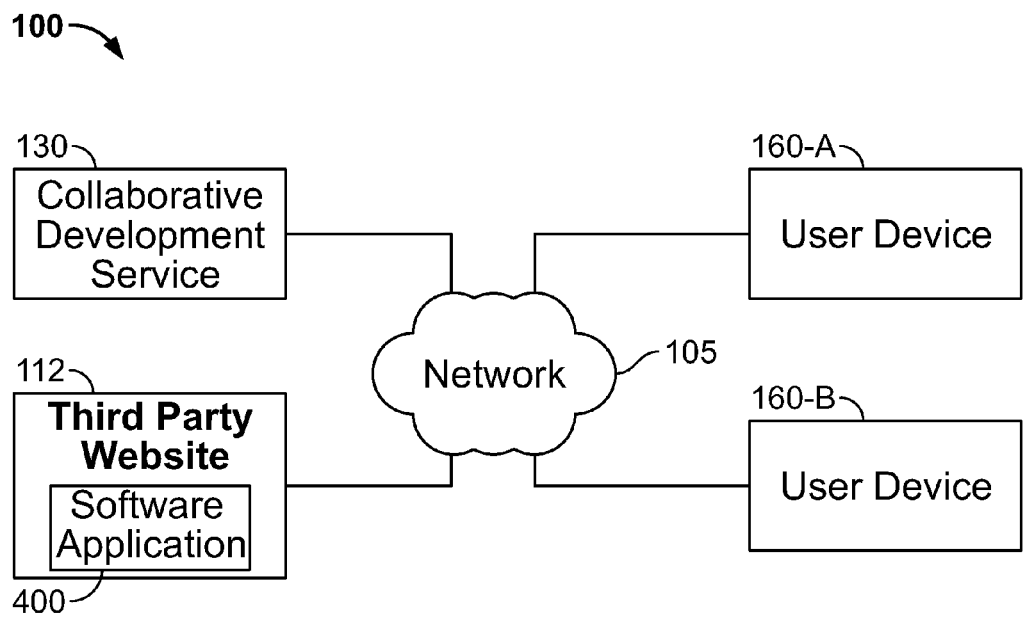
FIG. 1 shows a communication system that may be used to provide collaborative development services in accordance with an embodiment.

FIG. 1 shows a communication system 100 that may be used to provide collaborative development services in accordance with an embodiment. Communication system 100 includes a network 105, a collaborative development service 130, a third party website 112, and user devices 160-A, 160-B, etc. For convenience, the term "user device 160" is used herein to refer to any one of user devices 160-A, 160-B, etc. Accordingly, any discussion herein referring to "user device 160" is equally applicable to each of user devices 160-A, 160-B, etc. Communication system 100 may include more or fewer than two user devices.

In the exemplary embodiment of FIG. 1, network 105 is the Internet. In other embodiments, network 105 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may include a combination of different types of networks.

Collaborative development service 130 provides a platform and software development services to software developers, enabling developers to create, display, edit, and operate a variety of software applications, pertaining to a variety of different content types. For example, one or more developers may access collaborative development service 130 via network 105 and develop a software application that provides word processing services with respect to text documents. In other embodiments, collaborative development service 130 also enables developers to develop software applications that provide services relating to other content types, including, without limitation, spreadsheet applications, drawing tools, photo or image editing applications, video editing applications, design tools, software development tools, audio or music editing applications, games, etc. After a developer uses collaborative development service 130 to create a software application, the developer may maintain the software application at collaborative development service 130 or at third party website 112.

In the illustrative embodiment of FIG. 1, third party website 112 is a website associated with one or more software developers who are desirous of using collaborative development service 130 to create a software application. For example, third party website 112 may be a website associated with an entity that wishes to develop a word processing application, a music editing application, a spreadsheet application, or another type of software application, and that wishes to make the software application available to end users via the Internet.

Collaborative development service 130 also enables end users to access various software applications maintained by collaborative development service 130 or at third party web sites, and provides a platform to use a respective software application to create and edit documents. End users may access a variety of applications and create documents relating to a variety of different content types, including, without limitation, text documents, spreadsheets, drawings, photographs, images, video files, music or audio files, designs, etc. As used herein, the term "document" may also include a shared user space, created and/or used by a software application, that receives and maintains inputs from multiple end users. For example, an online game application may use a shared user space in which user inputs are received, and in which all or a portion of game-related actions are performed. Similarly, an online calculator may create a temporary shared user space in which user inputs are received and results are presented.

The term "end user" and "user" are used herein interchangeably.

Collaborative development service 130 may be accessible via a World Wide Web page that may be viewed using a conventional Web browser, for example. A developer may be required to log into a respective account to access a software application or document. Similarly, an end user may be required to log into a respective account to access his or her documents. Collaborative development service 130 may grant to a developer or end user access rights with respect to a software application or document, such as viewing and/or editing rights.

User device 160 may be any device that enables a developer or user to communicate via network 105. User device 160 may be connected to network 105 through a direct (wired) link, or wirelessly. User device 160 may have a display screen (not shown) for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

Figure 2:
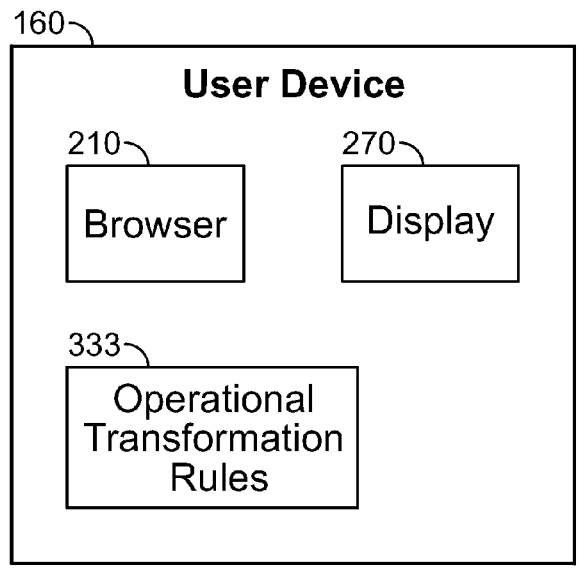
FIG. 2 shows functional components of an exemplary user device in accordance with an embodiment.

FIG. 2 shows functional components of an exemplary user device 160 in accordance with an embodiment. User device 160 includes a web browser 210 and a display 270. Web browser 210 may be a conventional web browser used to access World Wide Web sites via the Internet, for example. Display 270 displays software applications, documents, images, Web pages, and other information. For example, all or a portion of a document that a user creates or edits may be displayed on display 270. A set of operational transformation rules 333 is stored in user device 160. Operational transformation rules 333 are discussed in more detail below.

Figure 3:
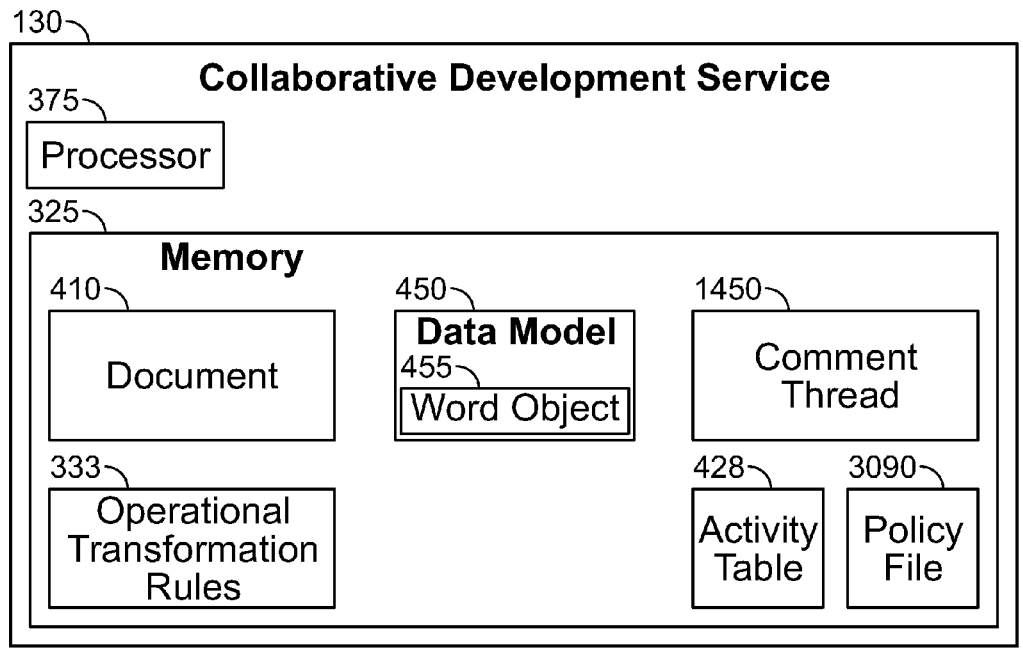
FIG. 3 shows functional components of a collaborative development service in accordance with an embodiment.

FIG. 3 shows functional components of collaborative development service 130 in accordance with an embodiment. Collaborative development service 130 includes a processor 375 and a memory 325. Collaborative development service 130 may include other components not shown in FIG. 3. Operational transformation rules 333 are also stored in memory 325 of collaborative development service 130 as well as in user device 160.

In accordance with the embodiment of FIG. 1, collaborative development service 130 provides an object-oriented software development architecture that allows developers to create software applications based on data models. In particular, collaborative development service 130 provides access to three basic data types for use in constructing a data model: ordered lists (arrays), maps, and primitives. Collaborative development service 130 supports several primitive types, including, without limitation, float, integer, Boolean, string, and date. A developer may generate an object using lists, maps, and primitives, and may further create a data model that includes one or more objects. The data models created in this manner may be used to create a software application relating to a variety of content types, including, without limitation, word processing applications, spreadsheet applications, drawing tools, photo or image editing applications, video editing applications, design tools, software development tools, audio or music editing applications, games, software applications having a shared user space, etc.

In accordance with an embodiment, a data model is a rooted tree, where nodes are either maps or ordered lists, and leaves are primitive values or empty data structures (e.g. an empty map). Any node in the tree can be specified using an ordered list, referred to as a "target path," of key names and array indices. Alternatively, any node in the tree may be assigned a unique identification. Mutations may specify their targets using the unique identification. A software application developed using collaborative development service 130 has a single root data model object, referred to as the root map. All application-specific data is nested inside the root map.

In accordance with an embodiment, collaborative development service 130 supports two operations for the instantiation and deletion of non-primitive objects, two operations on array data, and one operation on map data. The supported operations, or mutations, are described below. Although the mutations lists described below may be the minimal set of operations, there may be others than the ones listed.

ReplaceRange(String id, int index, List<Object|ObjectReference> values): Replaces a range of values in a list starting at the specified index with the specified replacement values.

CreateObject(String id, String typeName): Creates an empty object of the given type with the given id. The typeName may be a user-defined type name or one of the built-in types like "Map" or "Array".

DeleteObject(String id): Deletes an object with the given id. All references to an object must be removed before an object can be deleted. Mutations that refer to a deleted object are transformed to nothing. If an object deletion is undone, the reverse mutation includes all mutations necessary to fully reconstruct the deleted object.

Update(TargetPath path, Object value|ObjectReference objectId): Replaces a key in a map or an index of an array with the given primitive value or object reference. If the value is null, the key is deleted entirely. Array indices are updated using the Update( ) mutation.

Update(String id, String key, Object value|ObjectReference objectId): Replaces a key in a map or an index of an array with the given primitive value or object reference. If the value is null, the key is deleted entirely. Array indices are updated using the Update( ) mutation.

InsertBefore(TargetPath path, Object value|ObjectReference objectId): Inserts a primitive value or an object reference into an ordered list before a given index. All higher-indexed values in the list are shifted to the right.

InsertBefore(String id, int index, List<Object|ObjectReference> values): Inserts one or more primitive values or object references into an ordered list before a given index. All higher-indexed values in the list are shifted to the right.

Delete(TargetPath path): Deletes a value from an array. All higher-indexed values in the list are shifted to the left.

Delete(String id, int index, int count): Deletes one or more values from an array. All higher-indexed values in the list are shifted to the left.

In accordance with an embodiment, a developer may begin building an application by writing a data model definition file. Collaborative development service 130 provides a compiler service that compiles the data model definition file to generate a collection of Javascript files that represent the user's data model. The developer may code against this API.

In accordance with an embodiment, the developer may begin building an application by writing application code (including data model code) on a server (e.g. a server remote from collaborative development service 130). Collaborative development service 130 may supply software libraries allowing the developer to build custom data models with code hosted on the server. The custom data models are built on top of the basic data models provided by collaborative development service 130.

Accordingly, a developer employing user device 160 or other processing device may access collaborative development service 130 via network 105 and define one or more objects based on ordered lists, maps, and primitives. A developer may further construct a data model based on the objects built from the lists, maps, and primitives. For example, a data model may include a word object having an ordered list of alphanumeric characters defining a word, an image object having an ordered list of pixel values defining an image, a line graph object having an ordered list of values to be plotted, etc. A data model may include other types of objects built from the lists, maps, and primitives provided, such as a paragraph object, a spreadsheet column object, a line object, a rectangle object, etc.

A developer may then create a software application based on the data model. After a software application is created, the software application may be maintained at third party web site 112, for example. A user of the software application may access the software application via collaborative development service 130 and create a document. The user may then create an instance of an object, or object instance, within the document by defining the characteristics of the object. For example, supposing that software application defines a word object that includes an ordered list of alphanumeric characters, a user may create a document and generate an instance of the word object by typing a word, thereby specifying the alphanumeric characters within the list. The user may also specify other characteristics of the word object instance such as the font, size, etc.

Suppose, for example, that a developer associated with third party website 112 accesses collaborative development service 130 and creates a data model that includes a word object. The data model (including the word object) is stored in memory 325 as data model 450 and word object 455, as shown in FIG. 3. The developer then develops a software application based on the data model, and maintains the software application (indicated in FIG. 1 as software application 400) at third party website 112. In the illustrative embodiment, software application 400 is created for use in relation to a word processing application, and enables users to create and edit text documents. Software application 400 may include other word processing functions. For example, software application 400 may enable a user to create a paragraph (an instance of a paragraph object), a footnote (an instance of a footnote object), etc.

In accordance with an embodiment, after software application 400 is placed at third party web site 112, a user may access software application 400 via collaborative development platform 130 and use software application 400 to create and/or edit a document. Suppose, for example, that a user accesses his or her account at collaborative development service 130 and accesses software application 400, by clicking on a link on a web page, or by selecting an option from a menu, for example. Suppose further that the user employs software application 400 to create a text document. In the illustrative embodiment of FIG. 3, the user's document is stored in memory 325 as document 410.

Suppose now that the user uses software application 400 to edit document 410. In particular, the user types text within document 410, including one or more words. When the user types a word, collaborative development service 130 generates an instance of word object 455 by defining an ordered list containing the alphanumeric characters specified by the user, and by specifying any other associated characteristics of the word. Supposing, for example, that the user types the alphanumeric characters "helloworld," collaborative development service 130 generates within document 410 a word object instance 424 which includes an ordered list 407 containing the alphanumeric characters "helloworld," as shown in FIG. 4B.

Figure 4A:
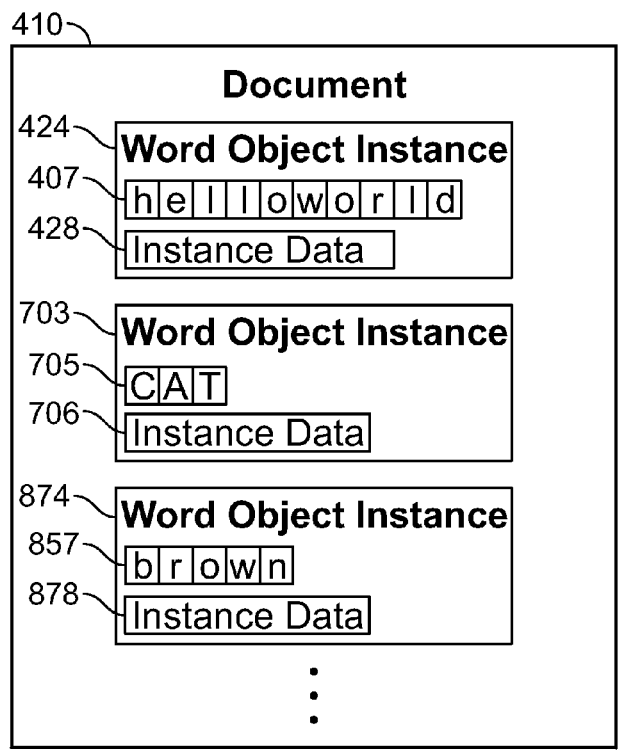
FIG. 4A shows a document in accordance with an embodiment.
Figures 4B, 5:
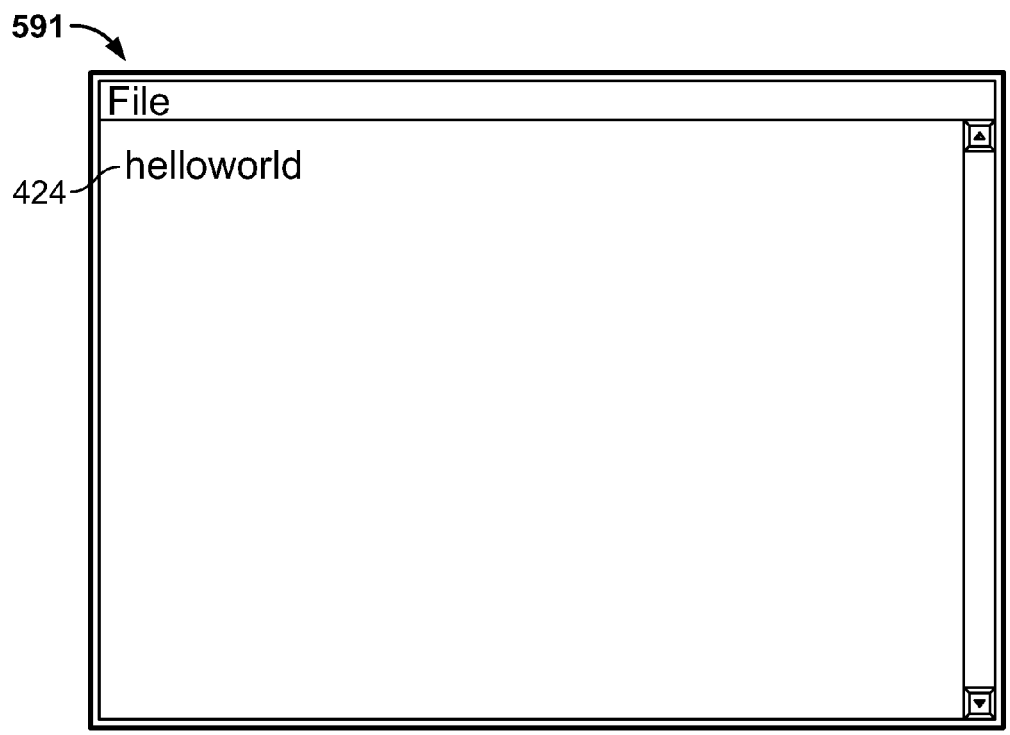
FIG. 4B shows an activity table in accordance with an embodiment.
FIG. 5 shows a word object instance displayed on a web page in accordance with an embodiment.

Referring to FIG. 4A, word object instance 424 also includes instance data 428 which includes various types of data related to word object instance 424. Instance data 428 includes text layout information specifying the layout of the text defined by ordered list 407, such as numbered spacers corresponding to the relative location of each of the characters in the text. Object instance 424 may include other types of information not shown in FIG. 4B.

In other embodiments, layout information relating to an object instance may be stored separately from the object instance itself. For example, such data may be stored in a database, table, or in another type of data structure.

A well-known technique used to display information on a user device includes transmitting data adapted to cause the user device to display all or a portion of the information on a Web page. For example, collaborative development service 130 may transmit to browser 210 (of user device 160) a request, in the form of HyperText Markup Language (HTML), adapted to cause browser 210 to display a representation of word object instance 424. In response, browser 210 displays a representation of object instance 424. FIG. 5 shows a web page 591 on which word object instance 424 is displayed as part of a text document, in accordance with an embodiment.

In an embodiment, an object instance may be updated based on one or more instructions received from users. For example, an instruction to add a letter to the end of word object instance 424 may be received from a user employing a user device 160. In response, collaborative development service 130 modifies word object instance 424, and then transmits a request to user device 160 to redraw word object instance 424 on display 270 to effect the change in the visual representation of the word object instance. In response to the request, user device 160 redraws word object instance 424 on display 270 to reflect the change.

In accordance with an embodiment, collaborative development service 130 maintains a record of all user activities and revisions related to a particular document in a user activity table, and enables users to view activity and/or revision history pertaining to the particular document. FIG. 4B shows an example of an activity table that may be associated with document 410 in accordance with an embodiment. Activity table 428 includes a column 434, which indicates a date and time of an activity perform by a user, such as accessing or leaving a document, or making a revision to the document. Activity table 428 includes a column 436 identifying the user who performed the activity. Column 438 describes the activity performed by the user, such as entering or leaving a document, or making a change to the document. For example, row 451 indicates that User 1 performed a first activity, Activity 1, at MM/DD/YYYY at 12:01:01. Row 452 contains data related to a second activity performed by User 2 at MM/DD/YYYY at 12:03:05. In this example, activity table 428 is stored in memory 325, as shown in FIG. 3.

In accordance with an embodiment, collaborative development service 130 utilizes fundamental edits to provide editing features. The fundamental edits correspond to the smallest changes that may be made to an object instance, and may be utilized in various combinations to provide all of the possible editing functions provided by collaborative development service 130. The fundamental edits may vary by content type.

For example, fundamental edits for a word processing editor may include inserting a character, deleting a character, applying a style, inserting an entity (e.g., a numbered list), and updating an entity. Fundamental edits for a drawing tool may include moving an object one pixel in a given direction, deleting an object, etc.

As fundamental edits are applied to an object instance, activity table 428 is updated such that a revision history, including a running collection of applied changes, is maintained.

Combinations of two or more fundamental edits may be referred to as a command. As such, commands correspond to modifications that make use of two or more fundamental edits. For example, an "Insert Column in Table" command may utilize multiple "insert character" fundamental edits, and may also utilize multiple "apply style" fundamental edits to insert a column into a table within a document.

Redraw Optimization

When instructions requesting multiple fundamental edits with respect to a particular object instance are received from a user device 160, collaborative development service 130 applies each requested fundamental edit to the object instance in response to instructions. However, rather than sending to user device 160 a separate request to redraw the visual representation of the object instance after applying each fundamental edit to the object instance, collaborative development service 130 instead determines an efficient redraw approach that reduces the number of redraws required. For example, collaborative development service 130 may analyze the instance data associated with the object instance, including layout data, and/or revision history data within activity table 428 indicating multiple fundamental edits performed during execution of a command, and based on such information, merge several fundamental edits or otherwise reduce the number of redraws needed to render the changes as compared to the number of fundamental edits that have actually been applied to the object instance. A request is then transmitted to one or more user devices to redraw the object instance to effect the changes in the visual representation of the object instance.

In one example, following either a full or partial completion of an instruction pertaining to an instance of a text object (a word object, a paragraph object, etc), the instance data (including updated layout data) and the revision history data within activity table 428 may be analyzed to determine which alphanumeric characters, lines, or sections of the document have been affected. In a specific example, when a command includes a first fundamental edit that is applied to a particular alphanumeric character, and a second fundamental edit that supersedes the first fundamental edit (e.g., a letter "g" is typed, and then a letter "p" is typed in the same position), a redraw approach may be determined that eliminates the first fundamental edit. In another example, fundamental edits that affect adjacent alphanumeric characters may be merged.

A request is transmitted to one or more user devices 160 to redraw the visual representation of the updated object instance, thereby efficiently redrawing the object instance on user device 160 using a reduced number of redraws (e.g., by combining two or more of the redraws into a single redraw). In such a manner, the number of redraws that are used to redraw the visual representation of the object instance is less than the number of fundamental edits that were performed as part of the command. Examples of systems, methods and apparatus for determining a redraw approach using a reduced number of required redraws to render an updated object instance are described in U.S. patent application Ser. No. 13/006,259, entitled "Merging Electronic Document Redraws," filed Jan. 13, 2011, which is incorporated herein by reference.

In accordance with an embodiment, a plurality of instructions specifying respective changes to an object instance are received from a user device 160 and applied to the object instance. An efficient redraw approach reflecting the requested changes is then determined. An instruction to implement the redraw approach is then transmitted to the user device 160. The user device 160 redraws the object instance based on the instruction.

While the discussion herein uses examples relating to text documents and word object instances, the methods and systems described herein may be applicable to determine a redraw approach for object instances related to a variety of content types, including, without limitation, spreadsheets, drawings, photographs, images, videos, designs, music, software code, games, a software application having a suitable shared user space, etc.

For example, one approach to reducing the number of redraws applied to an object instance relates to adjacent character insertions in a collaborative typing context. For example, when a user who wishes to edit text document 410 requests a first character insertion, and then requests a second character insertion adjacent to the first (e.g., a first requested operation is to insert the characters "ab" at a given location, and a second requested operation is to insert characters "cd" adjacent to the inserted characters), a non-optimized redraw approach may include performing two separate redraws of the line—first to redraw the line with the characters "ab" inserted at the appropriate location, and then to redraw the line with the characters "cd" inserted at the appropriate location. However, in accordance with an embodiment, the insertions are merged such that the insertions are achieved by a single redraw of the text. A request to redraw the object instance in this manner is transmitted to user device 160, and a single redraw is performed.

Returning to the illustrative embodiment, suppose that a user employing a user device 160 accesses object instance 424 and begins to edit the object instance. For example, the user may generate instructions to edit the object by pressing a key on a keyboard, or by pushing a button on a computer mouse, etc. Instructions reflecting the user's changes are transmitted to collaborative development service 130 by user devices 160.

Figure 6:
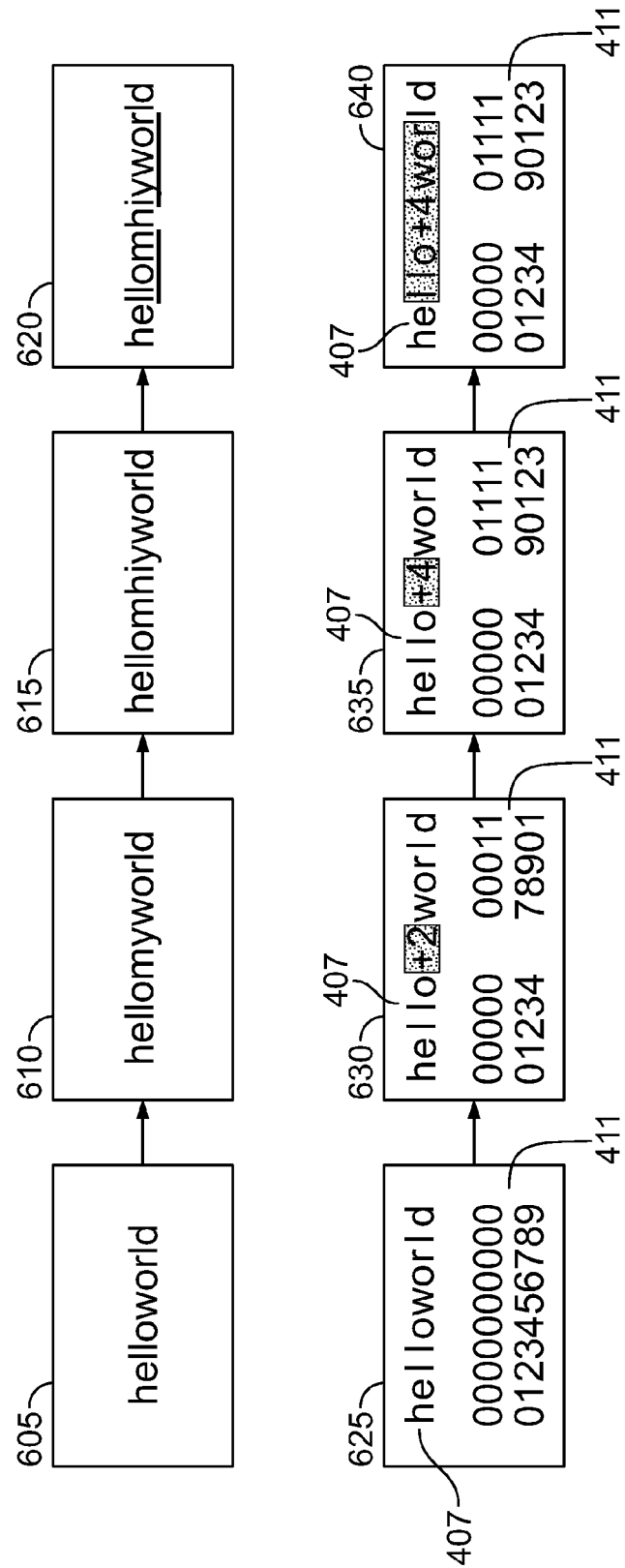
FIG. 6 illustrates several changes made to a word object instance in accordance with an embodiment.

FIG. 6 is an illustration of several changes made by the user to object instance 424 in accordance with an embodiment. The top row of boxes 605, 610, 615, and 620 indicate a series of edits to word object instance 424 desired by the user, which are specified by instructions received from the user. The bottom row of boxes 625, 630, 635, and 640 illustrate changes actually made to word object instance 424 by collaborative development service 130 in response to the user's instructions.

Box 605 shows word object instance 424 before an instruction is received. Box 625 shows list 407, and also shows text layout information 411, which includes a portion of instance data 428 that pertains to the layout of the text. Numbered spacer "00" corresponds to the first letter in list 407, "h", and numbered spacer "07" corresponds to the eighth letter in list 407, "r", etc.

A first instruction specifying a first desired change to the object instance is received from user device 160. Referring to box 610, the user inserts the characters "my" after the "hello" text and before the "world" text. User device 160 transmits a request to make the desired change. Referring to box 630, the insertion is represented in layout information 411 as the insertion of two additional spacers following the fifth spacer (numbered "04"), which corresponds to the last character in "hello," and renumbering the remaining spacers accordingly to accommodate the two inserted characters.

User activity table 428 (shown in FIG. 4B) is also updated to specifically identify the change, and the date and time the change was requested. Activity table 428 is further updated to identify the user of user device 160 as the source of the instruction.

In the illustrative embodiment, the user transmits an additional instruction to modify the text further by inserting the characters "hi" between the "m" and the "y" characters that were previously inserted, as shown in box 615. Referring to box 635, in layout information 411 the second insertion is merged with the first insertion rather than being handled separately. As such, in layout information 411 the change is represented as an insertion of four characters after the "hello" text and before the "world" text. The two insertions are represented as the insertion of four additional spacers following the fifth spacer (number "04"), and renumbering the remaining spacers accordingly.

An instruction is now received from the user to modify word object instance 424 by applying an "underline" style to the "llomhiywor" text, as shown in box 620. Referring to box 640, layout information 411 is modified to convey that the "underline" style should be applied to spacers numbered "02" through "11", and therefore, that the range of spacers numbered "02" through "11" should be updated.

Activity table 428 is updated to specifically identify these changes, and the date and time the change were requested. Activity table 428 is further updated to identify the user of user device 160 as the source of the instructions.

A redraw approach is now determined based on the changes made to object instance 424. In the illustrative embodiment, layout information 411 indicates that the range of spacers number "02" through "13" should be updated in a single operation to effect the changes made to object instance 424.

In an embodiment, data model change notifications may be used on other ways, besides redraw optimization. For example, if a third-party application maintained an index for quickly searching a large data model, the data model change notifications could be used to quickly update that index.

The optimized redraw approach is used to update the visual representation of the object instance is updated on user device 160. Collaborative development service 130 transmits a request to user device 160 to update the visual representation of object instance 424 by redrawing the range of spacers numbered "02" through "11" to effect the changes specified in the modified instance data 428. In the illustrative embodiment, the request directs user device 160 to complete the changes by performing a single redraw, instead of three redraws. In response, user device 160 performs a single redraw in accordance with the request to effect the specified changes.

Operational Transformations

In accordance with an embodiment, collaborative development service 130 may receive, substantially simultaneously, from a plurality of user devices, multiple instructions specifying respective changes to an object instance. In response, collaborative development service 130 uses operational transformation rules 333 to determine, for each respective user device, a transformed instruction, or set of transformed instructions, to cause the user device to display the changed object instance accurately and consistently, and transmits the transformed instruction(s) to the respective user device.

Referring again to FIG. 3, operational transformation rules 333 include rules governing the modification of an object instance, and the redrawing of the visual representations of the object instance on multiple user devices, when multiple changes are made to the object instance. In one embodiment, operational transformation rules 333 resolve conflicting changes specified in a plurality of instructions received from a plurality of user devices. When a plurality of instructions received from a plurality of user devices specify conflicting changes to a document that may create inconsistent visual representations of the document across the respective user devices, one or more operational transformations are applied to generate one or more transformed operations operable to reflect the specified changes in a consistent manner in the visual representations displayed on the respective devices. In particular, the rules apply a logic that contextualizes the changes specified by multiple instructions to determine a resolution that will result in a consistent visual representation of a document or object instance across multiple devices, without creating a collision (such as a temporal paradox or a data model inconsistency or a race condition). In one embodiment, operational transformations are applied to instructions received from user devices in real-time or substantially in real-time, to enable the respective user devices to update the respective visual representations of the document in real-time or substantially in real-time.

Referring to FIG. 3, processor 375 examines instructions received from respective user devices 160 and selectively applies operational transformation rules 333 to determine transformed operations. In an embodiment, processor 375, in accordance with operational transformation rules 333, examines a first instruction P (received from a first device) specifying a first change to an object instance, and a second instruction Q (received from a second device) specifying a second change to the object instance, and determines a set of transformed operations (P',Q') in accordance with the following transformation rule:

$$T(P,Q) \rightarrow P', Q' \text{ such that } P*Q' == Q*P' \quad \text{(Rule 1)}$$

The application of Transformation Rule 1 is described in the illustrative embodiments discussed below.

Figure 7A:
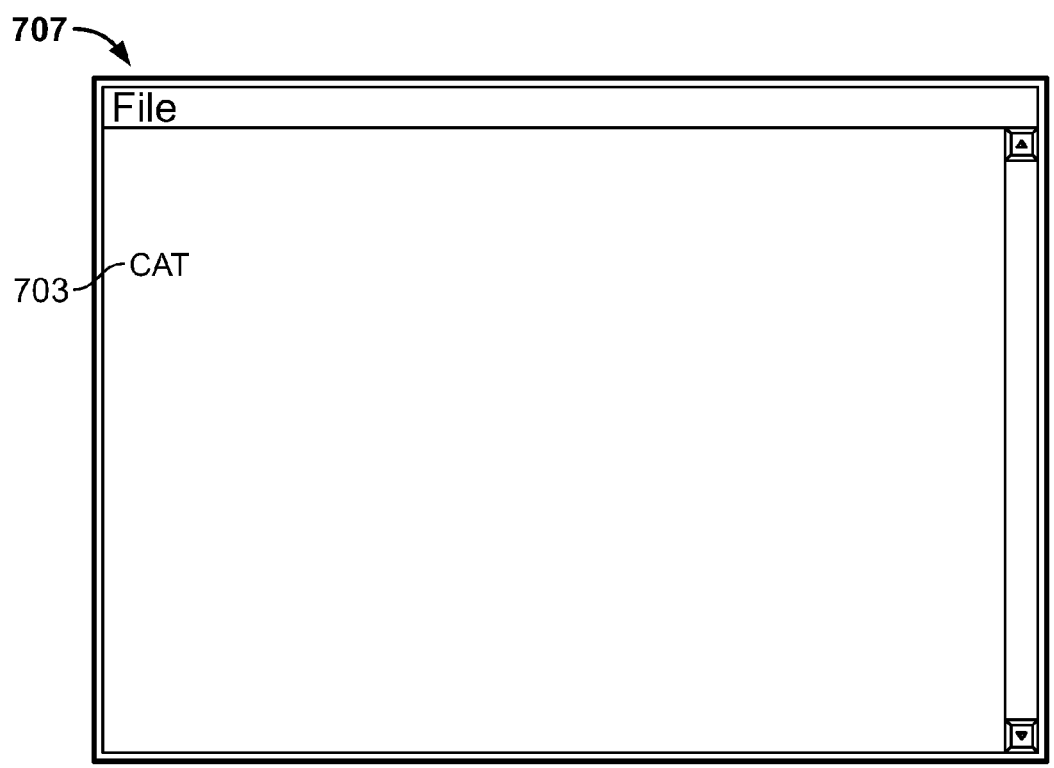
FIG. 7A shows a word object instance displayed on a web page in accordance with an embodiment.

Suppose, for purposes of illustration, that a first user employing user device 160-A, uses collaborative development service 130 to access software application 400, and accesses document 410. A second user employing user device 160-B, simultaneously accesses document 410 in the same manner. The first user types the word "CAT" within document 410. Referring to FIG. 4A, a word object instance 703 (including ordered list 705 and instance data 706) is created within document 410. Word object instance 703 is viewed by the first and second users via web pages displayed on user device 160-A and user device 160-B, such as web page 707 shown in FIG. 7A.

The first and second users now wish to collaboratively edit the word "CAT." Processor 375 receives from user device 160-A a first instruction, reflecting a change made by the first user, to replace the first character "C" of a word object instance "CAT" with the characters "CH." A second instruction, reflecting a change made by the second user, is received from user device 160-B to replace the third character of the word, "T", with the character "R." The second instruction is received by processor 375 before a request has been transmitted to the user device 160-B to update that device's visual representation of the word based on the first instruction.

Figure 7B:
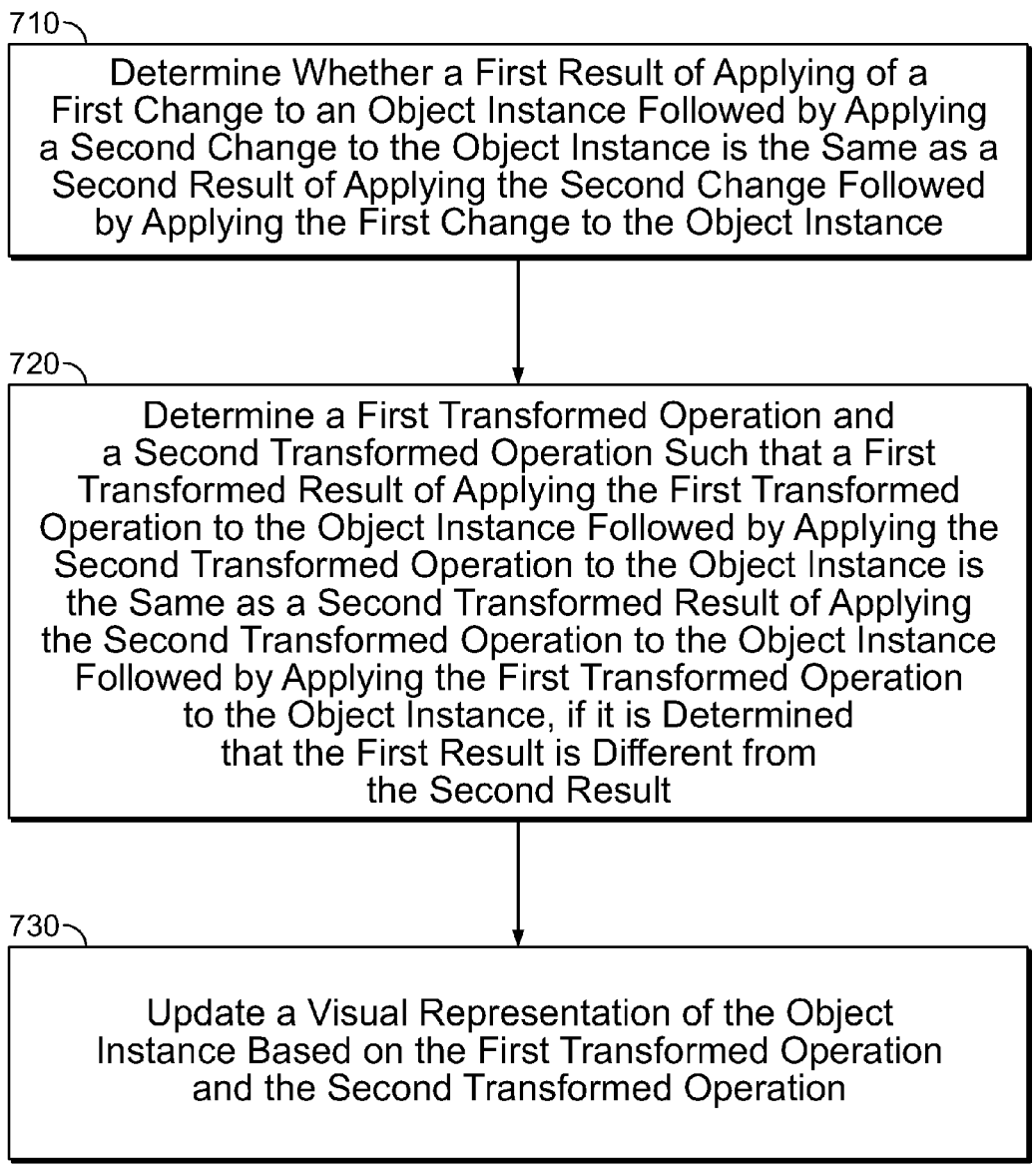
FIG. 7B is a flowchart of a method for providing collaborative development services in accordance with an embodiment.

FIG. 7B is a flowchart depicting a method of updating a visual representation of an object instance in accordance with an embodiment. At step 710, a determination is made as to whether a first result of applying of a first change to an object instance followed by applying a second change to the object instance is the same as a second result of applying the second change followed by applying the first change to the object instance. In the illustrative embodiment, processor 375 determines that application of the first change followed by application of the second change results in the character string "CHRT", while application of the second change followed by application of the first change results in the character string "CHAR," and that these two results are different. Therefore, requesting that the user devices to apply the first change and the second change may result in inconsistent visual representations on the users' devices (if, for example, user devices 160-A and 160-B apply the changes in a different order). Further, such a request may result in inconsistent data models on the users' devices.

If the first result and the second result are the same, there is no need to determine a transformed operation. If however, it is determined that the first result is different from the second result, then, at step 720, a first transformed operation and a second transformed operation are determined such that a first transformed result of applying the first transformed operation to the object instance followed by application of the second transformed operation to the object instance is the same as a second result of applying the second transformed operation to the object instance followed by application of the first transformed operation to the object instance. Processor 375 accordingly transforms the two changes into a pair of transformed operations: a first transformed operation to replace the first character "C" of the word with the characters "CH," and a second transformed operation to replace the fourth character "T" of the word object instance with the character "R" (instead of replacing the third character). Application of the first transformed operation followed by the second transformed operation produces the same result as application of the second transformed followed by the first transformed operation.

At step 730, a visual representation of the object instance is updated based on the first transformed operation and the second transformed operation. Accordingly, collaborative development service 130 transmits to user device 160-A and to user device 160-B respective requests to apply the first and second transformed operations to object instance 874.

User devices 160-A and 160-B receive the requests and apply operational transformation rules 333 to determine which of the requests to apply and which to disregard. If a user device receives from collaborative development service 130 a request to perform a change that it has already performed, the user device disregards the request. Therefore, for example, user device 160-A disregards the request to replace the first character "C" of the word object instance with the characters "CH." User device 160-A therefore applies the second requested operation (to replace the fourth character "T" of the word object instance with the character "R").

User device 160-B also applies operational transformation rules 333 to determine which of the two requests to apply and which to disregard. Because user device 160-B has replaced the third character of the word object instance "T" with the character "R," user device 160-B adds an additional operation to reverse the edit to the third character, and then applies the first and second requested operations to the word.

In another example, suppose that a first instruction is received from a first device to insert text of length X at the beginning of a word object instance of length Y, and a second instruction is received from a second device to insert text at the end of the object instance (after the Yth alphanumeric character), before any request has been transmitted to update the visual representation of the word object instance based on the first instruction. Processor 375, using operational transformation rules 333, transforms the two changes to a pair of transformed operations: a first transformed operation to insert the first text at the beginning of the word object instance, and a second transformed operation to insert the second text after the (X+Y)th alphanumeric character of the word object instance. Requests to perform the transformed operations are transmitted to both devices. This example is discussed further in the illustrative embodiment described below.

Figure 8A:
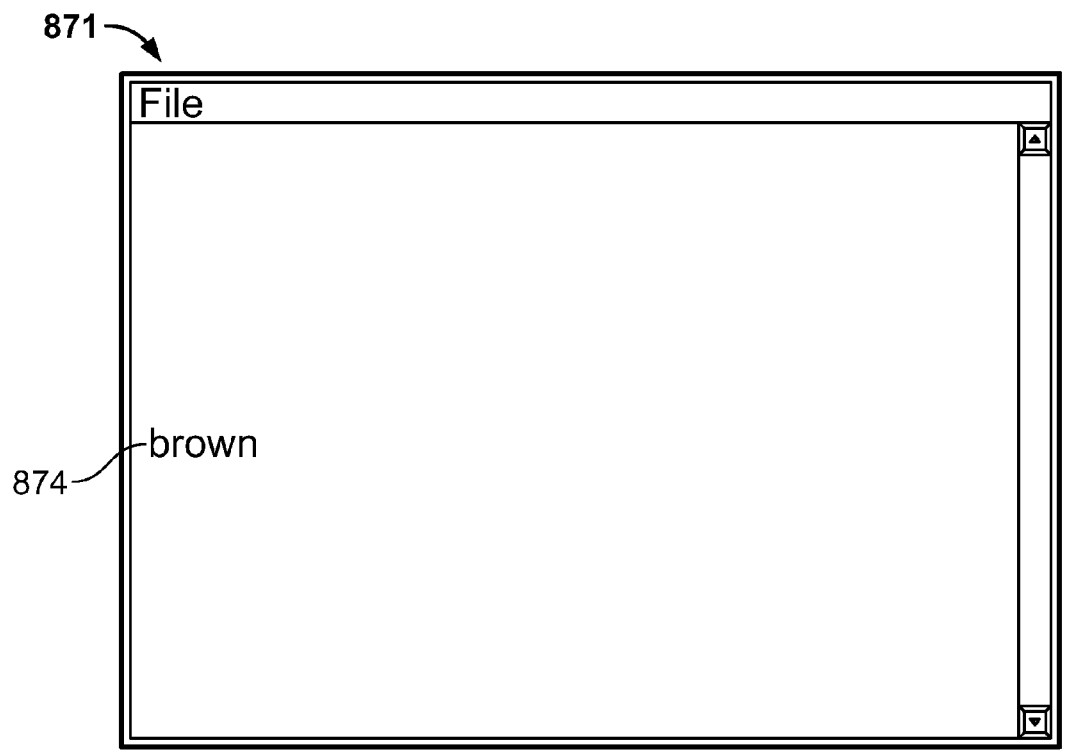
FIG. 8A shows a word object instance displayed on a web page in accordance with an embodiment.

Suppose now that a first user, wishing to edit text document 410, employs user device 160-A to access software application 400 via collaborative development service 130, and accesses text document 410. While editing document 410, the first user types the word "brown." Referring to FIG. 4A, a word object instance 874 is generated, including an ordered list 857 and instance data 878. Word object instance 874 is displayed on display 270 of user device 160-A. For example, browser 210 of user device 160-A may display word object instance 874 on a web page 871, as shown in FIG. 8A.

Figure 8B:
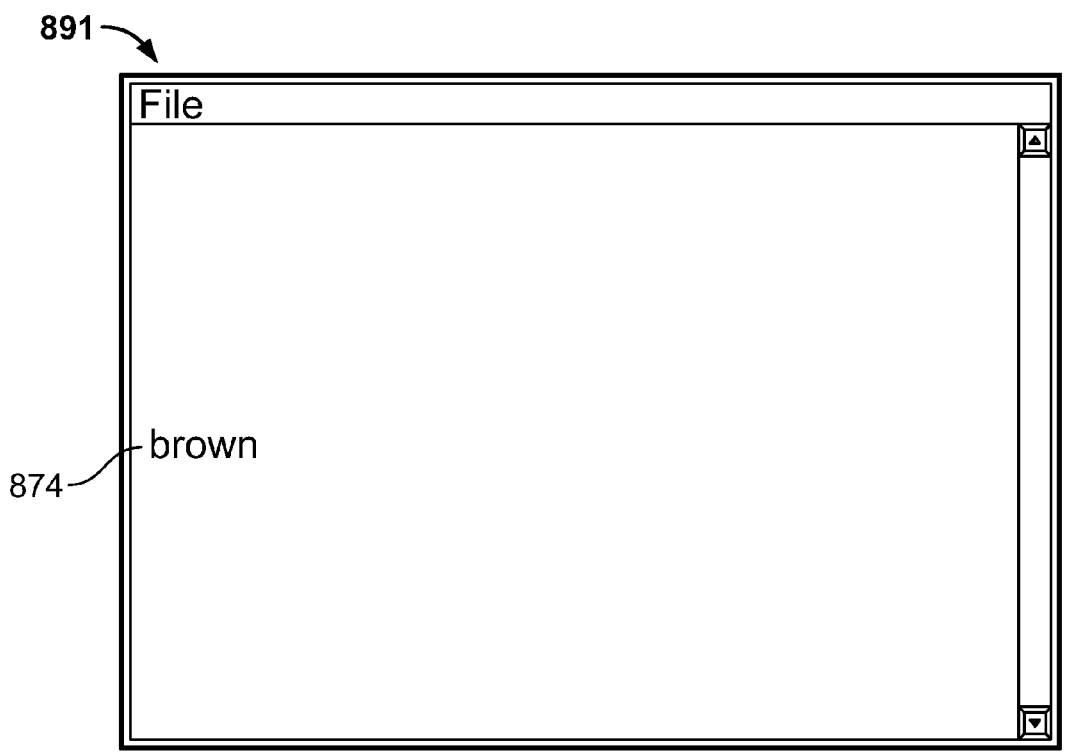
FIG. 8B shows a word object instance displayed on a web page in accordance with an embodiment.

Suppose now that a second user, employing user device 160-B, wishing to edit document 410 in collaboration with the first user, accesses software application 400 via collaborative development service 130, and accesses document 410. Word object instance 874 is also displayed on user device 160-B on a web page 891 similar to web page 871, as shown in FIG. 8B.

In accordance with an embodiment, when instructions are received from a plurality of user devices specifying a plurality of changes to an object instance, a transformed operation is determined based on the changes, and a request is transmitted to a user device to update a visual representation of the object instance based on the transformed operation. In one embodiment, a plurality of transformed instructions may be determined such that application of the transformed instructions, in any order, results in consistent visual representations of the object instance on the plurality of user devices.

Figure 9:
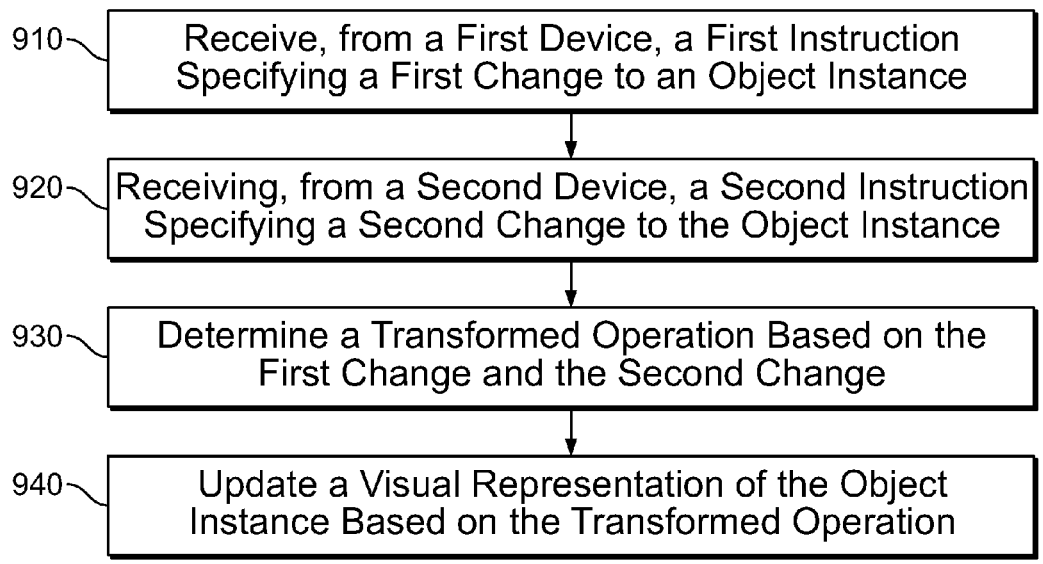
FIG. 9 is a flowchart of a method for providing collaborative development services in accordance with an embodiment.
Figure 10A:
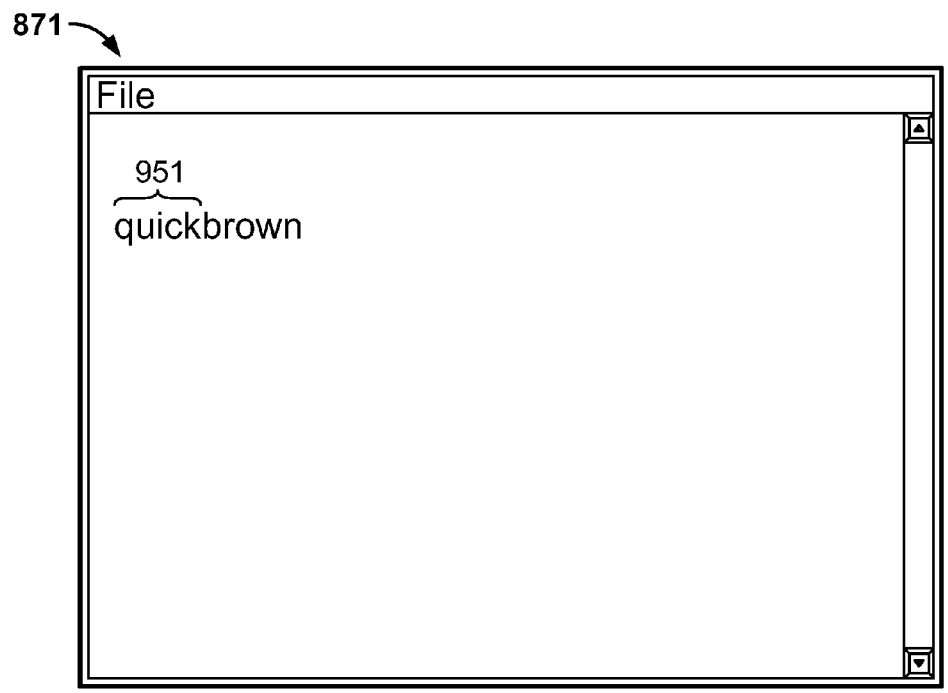
FIG. 10A is an example of a change made to a word object instance displayed on a web page in accordance with an embodiment.

FIG. 9 is a flowchart of a method to update a visual representation of an object instance in accordance with an embodiment. At step 910, a first instruction specifying a first change to an object instance is received from a first device. Referring to FIG. 10A, the first user inserts the text "quick" (951) at the beginning of word object instance 874. Browser 270 of user device 160-A displays the text "quickbrown," as shown in FIG. 10A, and transmits to collaborative development service 130 an instruction to insert the text "quick" at the beginning of word object instance 874. Collaborative development service 130 receives the instruction from user device 160-A.

Figure 10B:
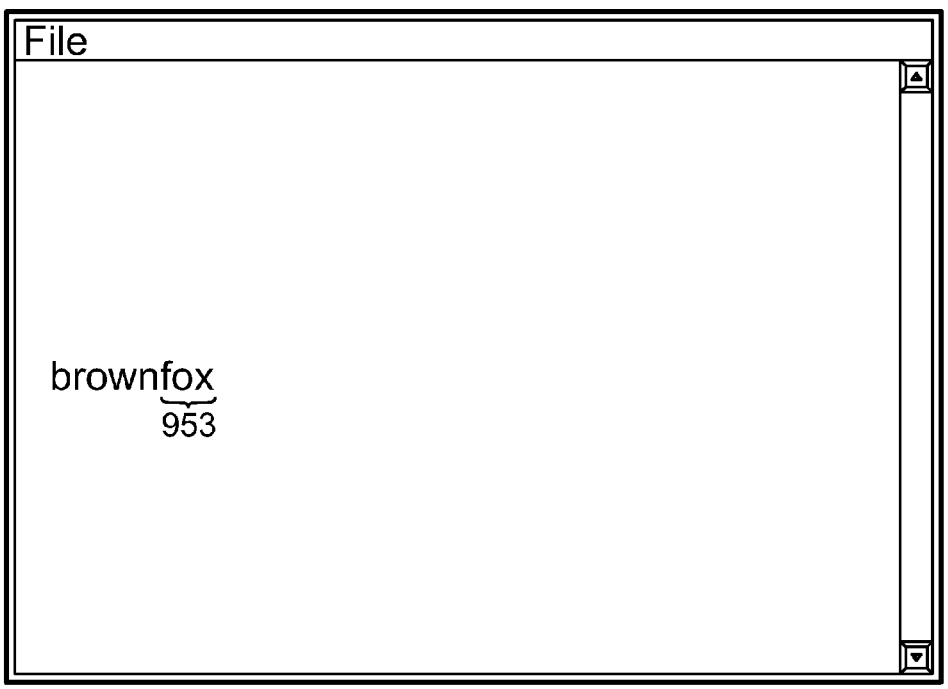
FIG. 10B is an example of a change made to a word object instance displayed on a web page in accordance with an embodiment.

At step 920, a second instruction specifying a second change to the object instance is received from a second device. Referring to FIG. 10B, the second user inserts the text "fox" (953) after the fifth alphanumeric character of word object instance 874. Browser 270 of user device 160-A displays the text "brownfox," as shown in FIG. 10B, and transmits to collaborative development service 130 an instruction to insert the text "fox" after the fifth alphanumeric character of word object instance 874. Collaborative development service 130 receives the instruction from user device 160-A. The first and second instructions are received by processor 375 substantially simultaneously (before any request has been transmitted to either user device to update a visual representation of the object instance).

Processor 375 examines the first change and the second change to determine whether the result of applying the first change followed by the second change is the same as the result of applying the second change followed by the first change. In the illustrative example, the results are different.

Accordingly, processor 375 determines that a set of transformed operations is required.

At step 930, a transformed operation is determined based on the first change and the second change. Processor 375 generates a first transformed operation to insert the text "quick" at the beginning of word object instance 874, and a second transformed operation to insert the text "fox" after the tenth alphanumeric character of word object instance 874. The result of applying the first transformed operation followed by the second transformed operation is the same as the result of applying the second transformed operation followed by the first transformed operation.

Figure 11A:
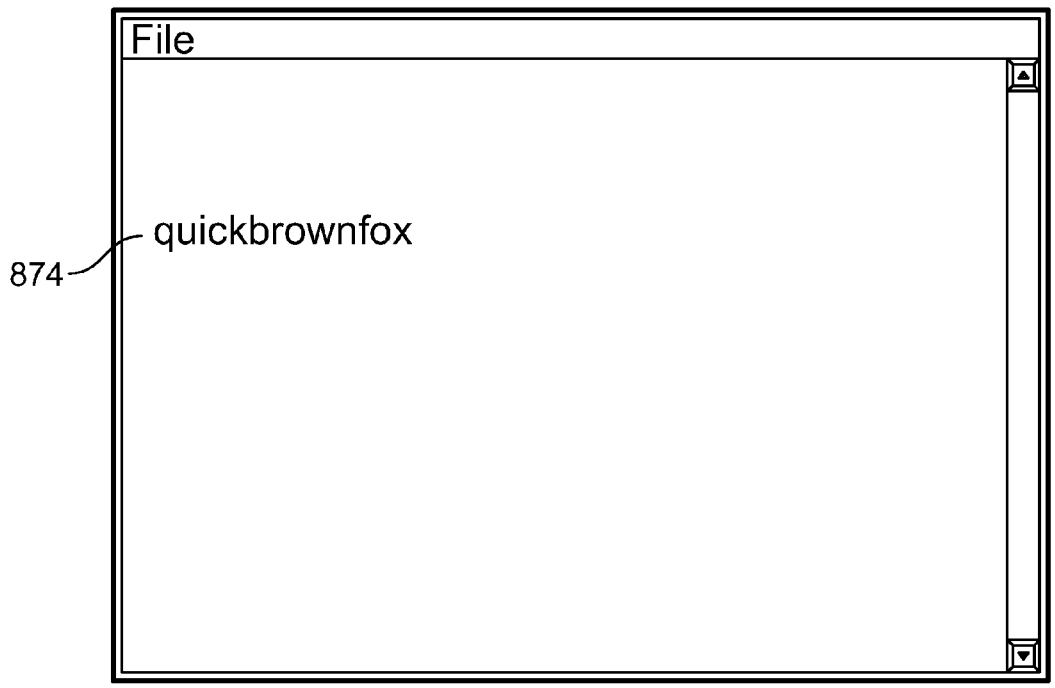
FIG. 11A is an example of an updated word object instance displayed on a web page in accordance with an embodiment.
Figure 11B:
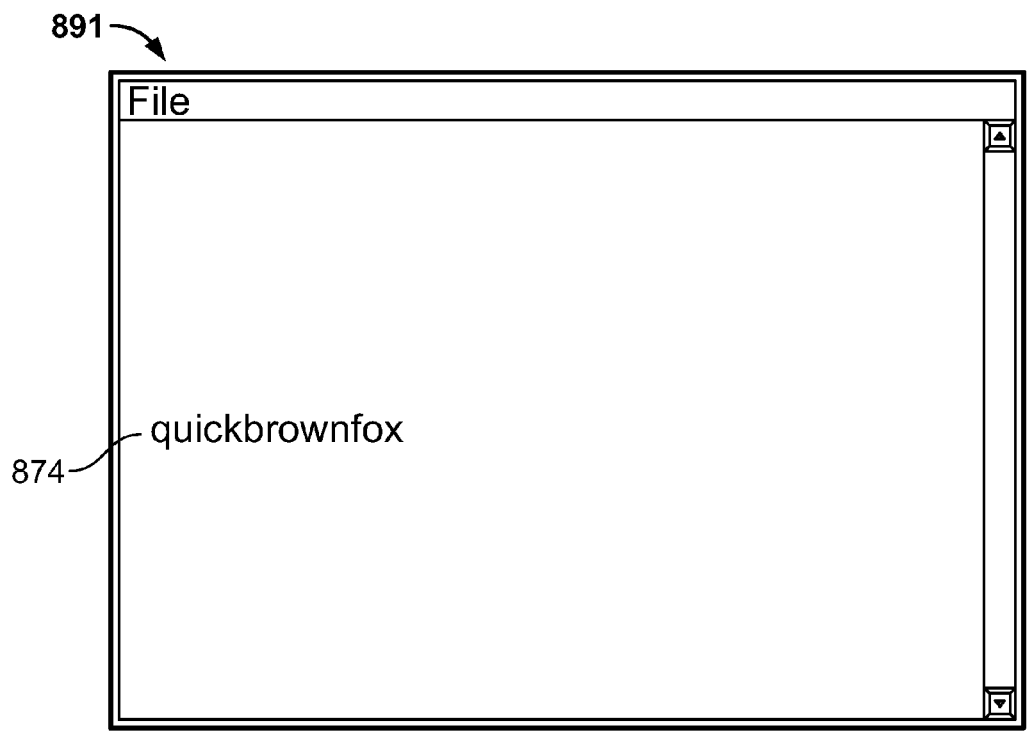
FIG. 11B is an example of an updated word object instance displayed on a web page in accordance with an embodiment.

At step 940, a visual representation of the object instance is updated based on the transformed operation. Collaborative development service 130 transmits a first request to user device 160-A to perform the first and second transformed operations, and a second request to user device 160-B to perform the first and second transformed operations. User device 160-A receives the request and, in response, redraws object instance 874 to effect the first and second transformed operations. User devices 160-B also receives the request and, in response, redraws object instance 874 to effect the first and second transformed operations. FIG. 11A shows updated word object instance 874 displayed on web page 871, displayed on user device 160-A. FIG. 11B shows updated word object instance 874 displayed on web page 891, displayed on user device 160-B.

In accordance with an embodiment, the methods described above are performed in real-time or substantially in real-time. Thus, collaborative development service 130 receives instructions from user devices 160, identifies conflicting changes to a document, determines any necessary transformed operations, and transmits to the user devices requests to apply the transformed operations to the devices' respective visual representations of the document, in real-time, or substantially in real-time, to provide to users a real-time collaborative editing experience.

In another embodiment, changes made by users may be processed in batch. Thus, collaborative development service 130 thus stores instructions as they are received from user devices 160. Collaborative development service 130 from time to time processes a batch of instructions, identifies conflicting changes to a document, determines any necessary transformed operations, and transmits to the user devices requests to apply the transformed operations to the devices' respective visual representations of the document.

The methods and systems described herein advantageously allow users of an online document processing service, and particularly users who wish to employ a third party software application to create and develop a document of any content type, to collaboratively develop and edit the document in real-time. Unlike existing methods and systems, the methods and systems described herein transform changes made by multiple users and display the changes on multiple devices in a consistent manner while avoiding collisions. Furthermore, the changes are displayed on multiple devices in real-time, allowing each user to view not only his or her own changes to the document, but also changes made by other users, in real-time.

In accordance with an embodiment, the redraw optimization methods described above may be combined with the operational transformation methods described above to transform various instructions received from users to generate one or more transformed operations, and then to determine an efficient redraw approach for redrawing an object instance to reflect the one or more transformed operations.

Undo

In accordance with an embodiment, a user who has made a change to a particular object instance may select an undo option to reverse the change. For example, a user may select an undo option from a drop-down menu displayed on display 270 of user device 160.

In one embodiment, each time user device 160 transmits to collaborative development service 130 an instruction to make a change to a particular object instance, user device 160 also stores transiently in memory a reverse instruction in a stack data structure. When the user selects the undo option, the most recent reverse instruction is retrieved from the stack and applied to the visual representation of the object instance on the user's particular user device. In this manner, a user may undo his or her own most recent change without affecting changes made by other users. In another embodiment, a user may selectively undo a change that he or she made within a document (even if the change is not the most recent change made by the user), without affecting any other change.

A redo option is also available to re-apply a change that has been reversed by the selection of the undo option.

Activity/Revision History

Figure 12:
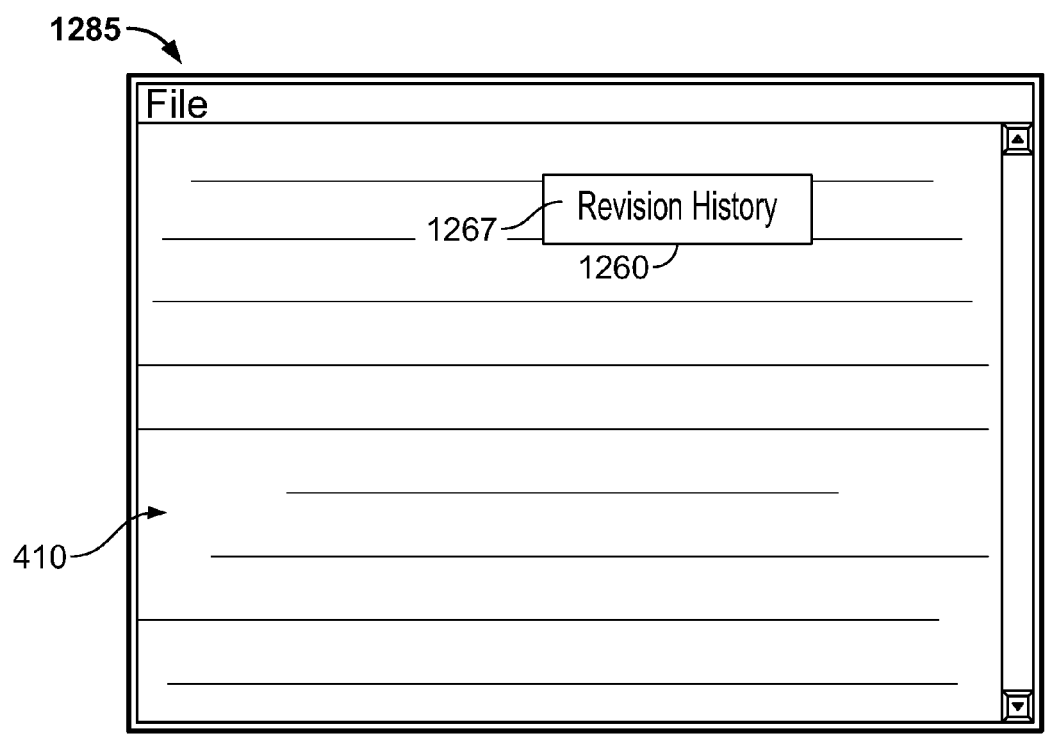
FIG. 12 shows a document and a revision history option displayed on a web page in accordance with an embodiment.
Figure 13:
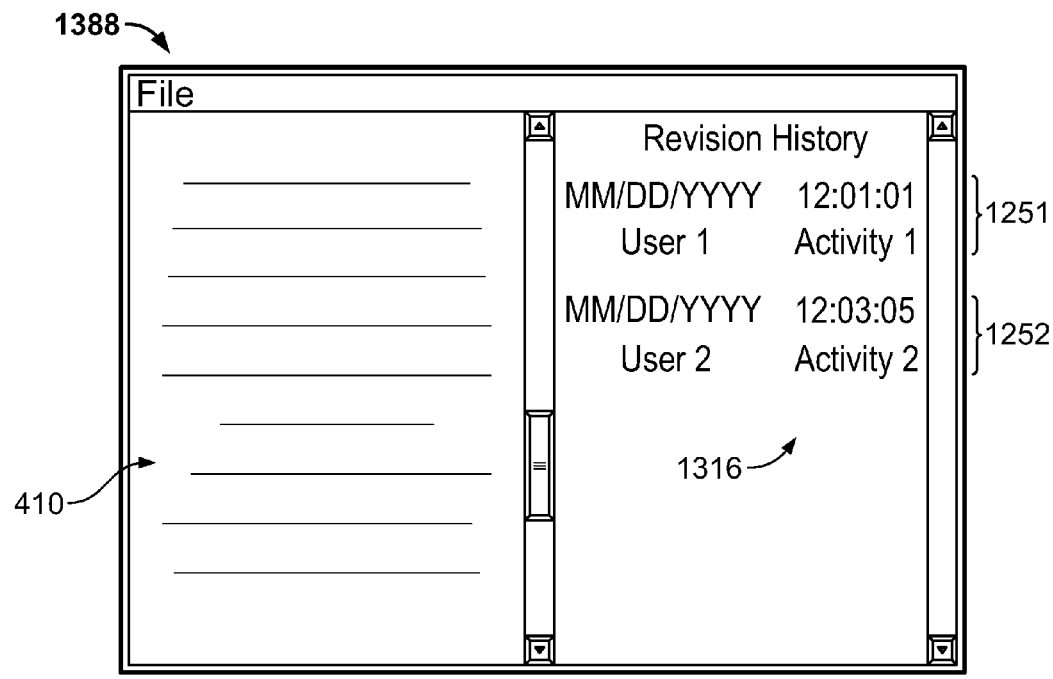
FIG. 13 shows a document and a revision history of the document displayed on a web page in accordance with an embodiment.

In accordance with an embodiment, a user viewing a document may view a list of revisions made to the document. Referring to FIG. 12, for example, a user viewing document 410 on a web page 1285 may press a button on a computer mouse to cause a menu 1260 to appear. In this example, menu 1260 includes a revision history option 1267. When the user selects revision history option 1267, collaborative development service 130 accesses activity table 428 and retrieves information relating to revisions made to document 410. Collaborative development service 130 causes user device 160 to display the document and the document's revision history on a page, such as web page 1388 shown in FIG. 13. A portion of document 410 is shown in a left-hand portion of page 1388. In a right-hand portion of the page, the document's revision history 1316 is shown. For example, the information from rows 451 and 452 of activity table 428, pertaining to the activities of User 1 and User 2, respectively, are displayed.

Comments

Figure 14:
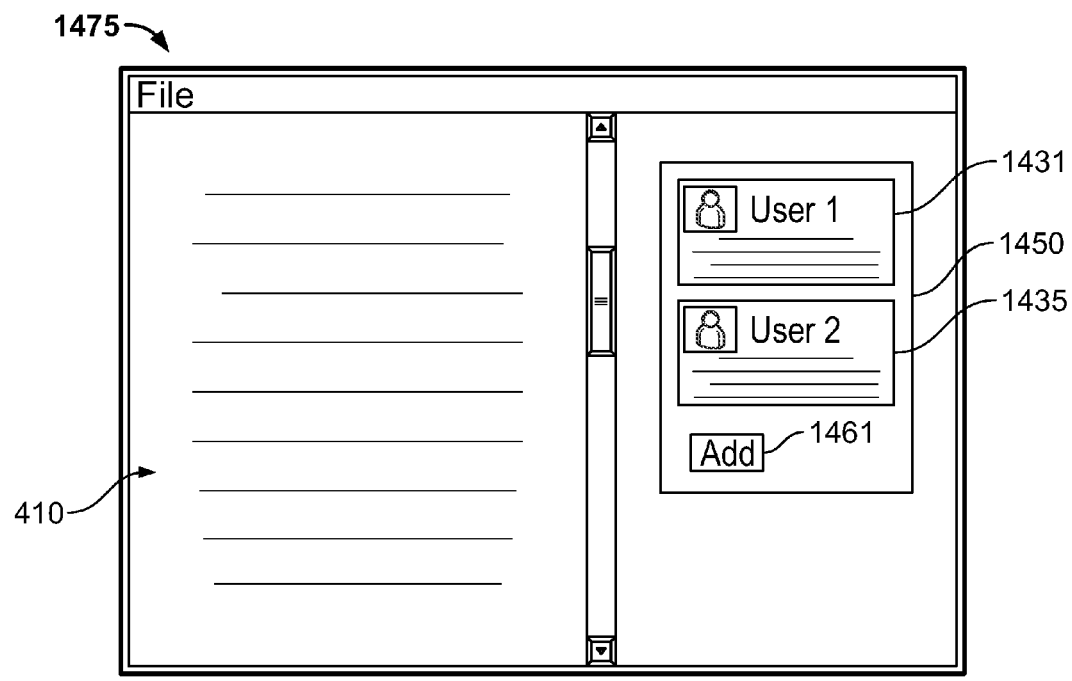
FIG. 14 shows a document and an associated comment thread displayed on a web page in accordance with an embodiment.

In accordance with an embodiment, collaborative development service 130 enables users to maintain a comment thread pertaining to a document, while the users are collaboratively editing the document. Referring to FIG. 14, a web page 1475 may be displayed on a user device 160. In this example, document 410 is displayed in a left-hand portion of the page. A comment thread 1450 is displayed in a right-hand portion of the page. In the illustrative embodiment, comment thread 1450 includes a first comment 1431 generated by a first user and a second comment 1435 generated by a second user. A user may add a comment to the comment thread by selecting an add button 1461 and composing a comment. When a new comment is added, comment thread 1450 is updated. Comment thread 1450 is stored in memory 325, as shown in FIG. 3.

In various embodiments, the method steps described herein, including the method steps described in FIG. 7B and/or FIG. 9, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 7B and/or FIG. 9. Certain steps of the methods described herein, including one or more of the steps of FIG. 7B and/or FIG. 9, may be performed by a server or by another processor in a network-based cloud-computing system. Certain steps of the methods described herein, including one or more of the steps of FIG. 7B and/or FIG. 9, may be performed by a client computer in a network-based cloud computing system. The steps of the methods described herein, including one or more of the steps of FIG. 7B and/or FIG. 9, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 7B and/or FIG. 9, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 15:
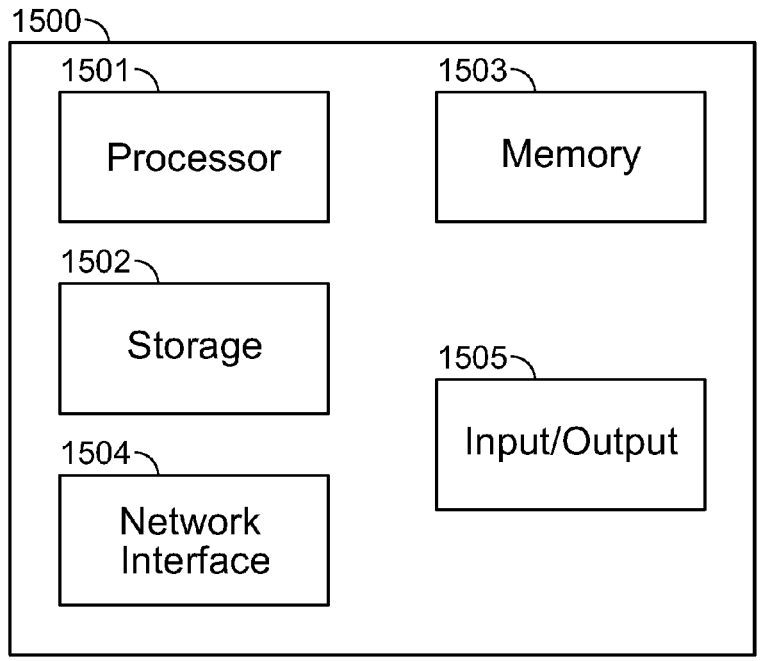
FIG. 15 shows components of a computer that may be used to implement the invention.

A high-level block diagram of an exemplary computer that may be used to implement systems, apparatus and methods described herein is illustrated in FIG. 15. Computer 1500 includes a processor 1501 operatively coupled to a data storage device 1502 and a memory 1503. Processor 1501 controls the overall operation of computer 1500 by executing computer program instructions that define such operations. The computer program instructions may be stored in data storage device 1502, or other computer readable medium, and loaded into memory 1503 when execution of the computer program instructions is desired. Thus, the method steps of FIG. 7B and/or FIG. 9 can be defined by the computer program instructions stored in memory 1503 and/or data storage device 1502 and controlled by the processor 1501 executing the computer program instructions. For example, the computer program instructions can be implemented as computer executable code programmed by one skilled in the art to perform an algorithm defined by the method steps of FIG. 7B and/or FIG. 9. Accordingly, by executing the computer program instructions, the processor 1501 executes an algorithm defined by the method steps of FIG. 7B and/or FIG. 9. Computer 1500 also includes one or more network interfaces 1504 for communicating with other devices via a network. Computer 1500 also includes one or more input/output devices 1505 that enable user interaction with computer 1500 (e.g., display, keyboard, mouse, speakers, buttons, etc.).

Processor 1501 may include both general and special purpose microprocessors, and may be the sole processor or one of multiple processors of computer 1500. Processor 1501 may include one or more central processing units (CPUs), for example. Processor 1501, data storage device 1502, and/or memory 1503 may include, be supplemented by, or incorporated in, one or more application-specific integrated circuits (ASICs) and/or one or more field programmable gate lists (FPGAs).

Data storage device 1502 and memory 1503 each include a tangible non-transitory computer readable storage medium. Data storage device 1502, and memory 1503, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1505 may include peripherals, such as a printer, scanner, display screen, etc. For example, input/output devices 1505 may include a display device such as a cathode ray tube (CRT) or liquid crystal display (LCD) monitor for displaying information to the user, a keyboard, and a pointing device such as a mouse or a trackball by which the user can provide input to computer 1500.

Any or all of the systems and apparatus discussed herein, including collaborative development service 130, user device 160, and components thereof, including web browser 210, display 270, operational transformation rules 333, processor 375, and memory 325, may be implemented using a computer such as computer 1500.

One skilled in the art will recognize that an implementation of an actual computer or computer system may have other structures and may contain other components as well, and that FIG. 15 is a high level representation of some of the components of such a computer for illustrative purposes.

In accordance with an embodiment, the systems and methods described above may be used to provide a collaborative development service to software developers and to end users. Collaborative development service 130 provides a platform for developers to create and edit a software application. After the software application has been developed, the software application may be maintained at a third party web site, such as third party web site 112, for example. In one embodiment, collaborative development service 130 is implemented using software residing on a server, for example.

In one embodiment, third party website 112 is associated with an address, such as a Uniform Resource Locator (URL). A link representing the URL may be placed in advertisements or on selected webpages to facilitate the use of the third party software application by end users. A user wishing to access the third party software application may do so by clicking on the link associated with the URL, for example. When a user, employing a user device 160, clicks on such a link, collaborative development service 130 executes the third party software application and allows the user to access functionality of the software application via an embedded frame displayed on the user's device.

Figure 16A:
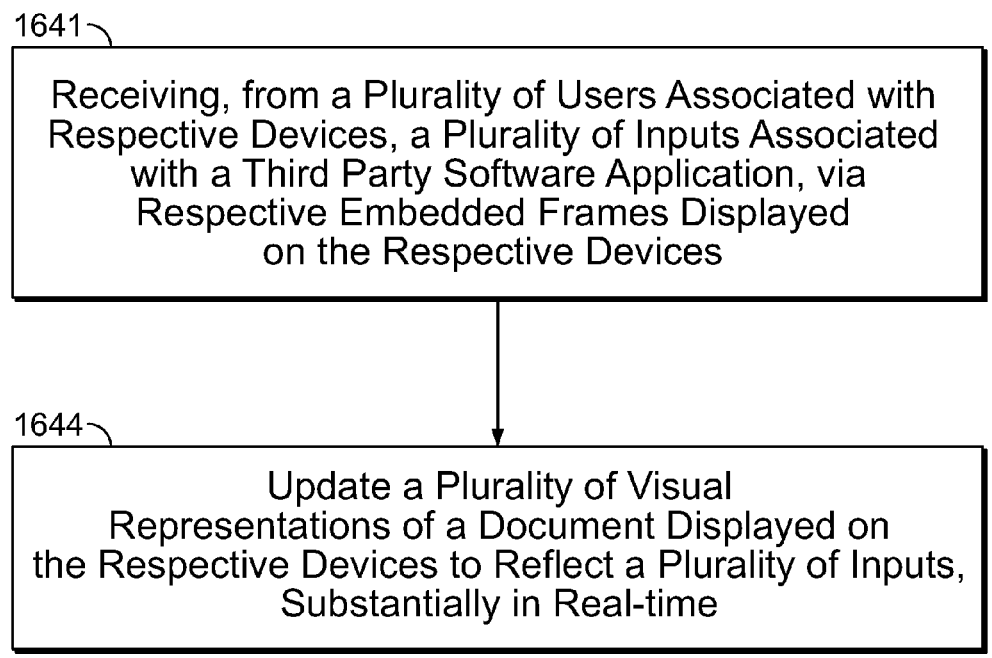
FIG. 16A is a flowchart of a method for updating a visual representation of a document in accordance with an embodiment.

Multiple users may use the software application to collaboratively create and edit a document. FIG. 16A is a flowchart of a method for providing collaborative development services in accordance with an embodiment. At step 1641, collaborative development service 130 receives, from a plurality of users associated with respective devices, a plurality of inputs associated with a third party software application, via respective embedded frames displayed on the respective devices. At step 1644, collaborative development service 130 updates a plurality of visual representations of the document displayed on respective devices to reflect a plurality of inputs substantially in real-time.

In one embodiment, one or more developers may create a software application based on a data model created in a manner such as that described above. The developers may use a pre-built set of data models, mutations, and supporting libraries that may enable them to quickly build highly functional collaborative data models using the collaborative development system platform. These data models are operational transformation ready, highly customizable and provide built-in support for developer-defined operations. These data models also provide built-in support for other features such as those described above (e.g., undo/redo, etc.).

Figure 16B:
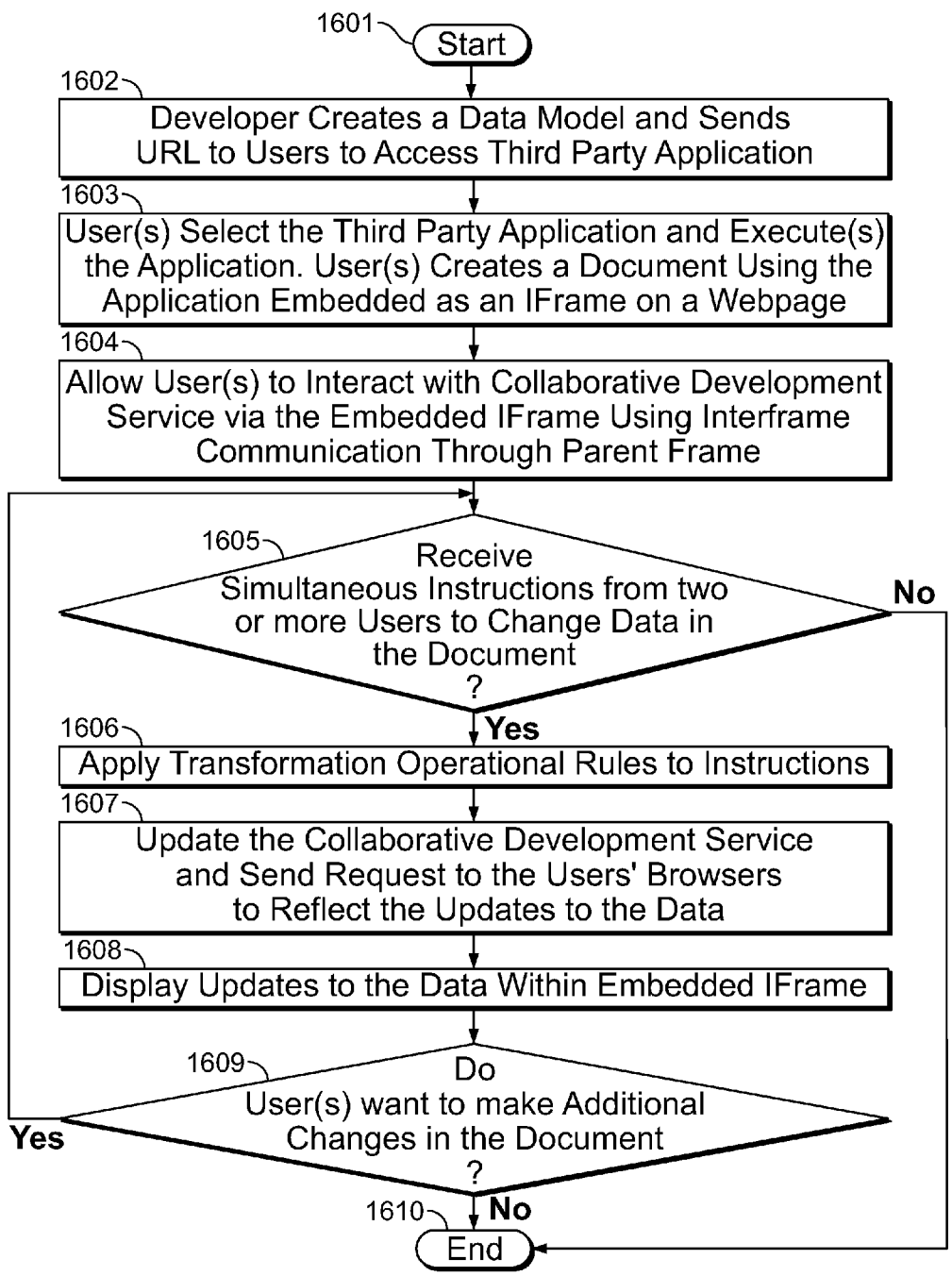
FIG. 16B is a flowchart of a method for providing collaborative development services in accordance with an embodiment.

FIG. 16B is a flowchart of a method of providing collaborative development service in accordance with an embodiment. At step 1601, the method starts. At step 1602, a developer creates a data model and constructs a third party application in a manner such as that described above. The developer then provides a URL to users who wish to access the third party application. At step 1603, the users select the third party application (e.g., by clicking on the URL) and execute the application. Collaborative development service 130 causes the third party software application to be executed and provides access to the application via an embedded frame. For example, the users may create a document using the application which is embedded as an IFrame on a webpage. At step 1604, the users interact with collaborative development service 130 via the embedded IFrame, using interframe communication through a parent frame. At step 1605, a determination is made whether substantially simultaneous instructions have been received from two or more users to change data in the document. If not, the method ends, at step 1610. If yes, transformation operational rules are applied to the instructions, at step 1606. At step 1607, collaborative development service 130 is updated, and requests are sent to the users' browsers to reflect the updates to the data. At step 1608, updates to the data are displayed within embedded IFrame in each user's display. At step 1609, a determination is made whether or not the users wish to make additional changes in the document. If so, the process returns to step 1605. If not, the process ends at step 1610.

Figures 17A, 17B:
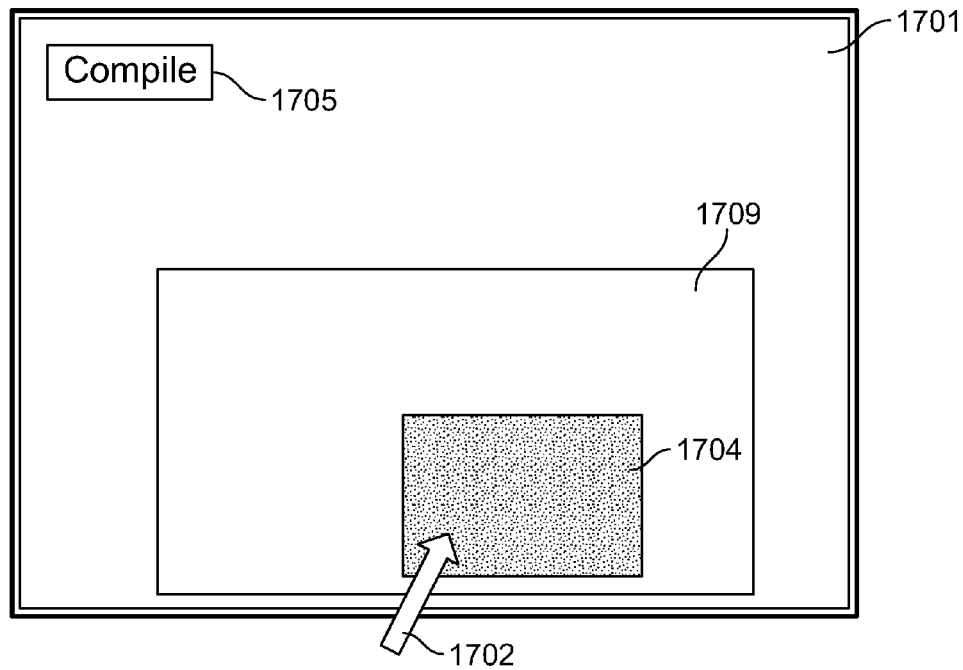
FIG. 17A shows an interface that may be used to develop a software application in accordance with an embodiment.
FIG. 17B shows an example of code used to develop a software application in accordance with an embodiment.

FIG. 17A shows a user interface 1701 that may be used by a developer to construct a software application in accordance with an embodiment. A developer provides input 1702 in order to build a data model. A developer may enter code in region 1709. In the illustrative embodiment, the developer inputs code 1704 to create a portion of the data model. Other code may be input anywhere in 1709. Additionally, the coding portion 1704 and/or 1709 may be displayed within a portion of an application and the application may provide menu buttons such as compile button 1705. An example of code that may be used is shown in FIG. 17B. The code shown is for exemplary purposes; any coding language and/or technique may be used.

As indicated by the code line 1706, the code may contain comments enclosed in between "//" or blocks of text enclosed in "/* */" characters, as is known. The data model code may also contain a package specifier indicating the closure package to which each data type in the file should be assigned when the file is compiled and data type stanzas consisting of an optional list of @prefixed annotations, a data type name, followed by a pair of braces enclosing a list of field specifications.

Annotations such as @Root which indicates the root data type, shown by code line 1707, are supported by the collaborative development service 130. In one embodiment, exactly one data type must be marked "@Root" and a compilation warning is displayed specifying a data type that is not reachable from @Root.

In one embodiment, field specifications in the code may consist of a data type, a field name, and a semicolon. Acceptable data types include any primitive type name, map, array (optionally parameterized) and any data type name specified in the data model definition. Field names and namespaces must be unique across all files in a compilation run. Package specifications are merely a convenience for the compiled output. Parameterized array data type may be followed by angle brackets containing another data type. This indicates that this array must contain values of a particular type. This may influence the compiler output and adds another level of runtime checking to the compiled code.

When the developer wishes to compile the code, he or she may select an option such as "Compile" button 1705, shown in FIG. 17A. Any compiler may be used to compile the code. In one embodiment, the compiler may accept 0 or more data model files. The compiler may also accept a compressed collection of 0 or more data model files and in return, produce a compressed list of outputs.

Figure 17C:
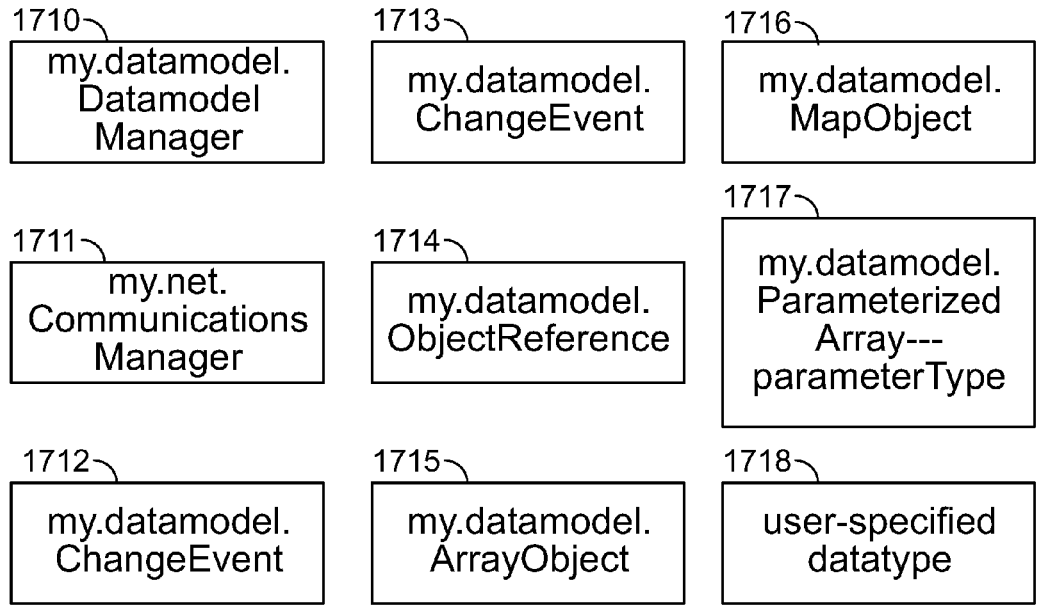
FIG. 17C shows various output classes that may result from compilation of a software application in accordance with an embodiment.

In one embodiment, for any collection of inputs, the compiler produces the standard outputs as shown in FIG. 17C. These outputs are discussed below.

Output 1710 represents my.datamodel.DatamodelManager, which is a standard singleton class that provides access to the Root data model object, a data model factory registry (to allow developers to use their own subclasses of generated data model objects), support for developer-defined user operations, and undo/redo support. The DatamodelManager is a required constructor parameter for all other compiler-generated data model classes. At least one customized method may be included to have the return type specified in the data model definition.

Output 1711 represents my.net.CommunicationsManager, which is a standard singleton class that provides hooks for setting up network communication with the collaborative development service 130 and loading the initial data models.

Output 1712 represents my.datamodel.ChangeEvent, which is the event fired when a datamodel object changes.

Output 1713 represents my.datamodel.DatamodelObject, which is the base class of all generated data types. This class includes basic capabilities such as event registration and low-level integration with the DatamodelManager.

Output 1714 represents my.datamodel.ObjectReference, which is a wrapper object that represents a reference to a non-primitive object. This object=contains the string identification (id) of the referenced object.

Output 1715 represents my.datamodel.ArrayObject, which is a subclass of DatamodelObject used to model unparameterized arrays.

Output 1716 represents my.datamodel.MapObject, which is a subclass of DatamodelObject used to model maps.

The compiler may also generate custom files based on a developer's data model definition files. These custom files are described as follows.

File 1717 represents my.datamodel.ParameterizedArray— parameterType which is a subclass of ArrayObject. For each parameterized array type in the data model definition file, a parameterized array type is created. The methods of ParameterizedArray objects are typed to enforce the proper content type, and they include runtime checking to ensure that only objects of the correct type are inserted into the array.

File 1718 represents a user-specified data type which is a subclass of DatamodelObject that is created for each user-defined type in the file. This file contains getter and setter methods for each field in the data model definition. The setter methods are tied into the DatamodelManager, so that whenever a field is "set", the appropriate mutation is generated, applied to the data model, added to the undo stack, and communicated to the server. Every DatamodelObject may support two closure event types:

my.datamodel.ChangeEvent.Type.CHANGED, which fires whenever the object changes, and my.datamodel.ChangeEvent.TypeDESCENDANT_CHANGED, which fires whenever any descendant object changes.

The ChangeEvent contains the mutations that represent the change that occurred. Because object graphs can be arbitrarily complex, the DESCENDANT_CHANGED event may have complex behavior. In a cyclic object graph, a change to a parent object may cause a DESCENDANT_CHANGED event to fire. This event may only fire once per object per mutation, even if the change affects an object that is a descendant of the target object via multiple paths.

Embedding a Software Application in an IFrame

After the developer compiles a software application, the developer may offer the software application for sale, offer the software application for use, or otherwise make the software application available, to end users. In one embodiment, a software application may be uploaded onto a third party website, where other users may access it in a manner described below. The software application, a portion of the application, and/or a document created using the application may be embedded within a website or webpage hosted by collaborative development service 130, in a known manner. For example, a software application may be embedded as an IFrame on the webpage. Other frames and/or applications may be embedded onto the webpage. In one embodiment, the contents of the webpage with the exception of the embedded IFrame are static and/or the same for all applications. The contents may include but are not limited to items such as hyperlinks, menu buttons, graphics, text, etc. Methods of embedding a software application, or a document, as an IFrame on a webpage are known.

When collaborative development service 130 embeds a third party software application on a webpage, a user may view the application running within the IFrame, and any related documents, on his/her browser. In one embodiment, the application may be a word processing application and the user may create and/or otherwise access a document using the word processing application. In another embodiment, the application may be a music editor and the client may create and/or otherwise access an existing or new notes editor document. The notes editor document may contain many different fields which may be edited by the user. Other types of applications and documents may be used.

Use of Third Party Software Application by End Users

In one embodiment, one or more users may access and/or use a third party software application via collaborative development service 130. For example, a third party software application may be created by one or more developers and made available via a third party website. The developers may, for example, advertise the application on the third party website or webpage. In another embodiment, the third party software application, or a Uniform Resource Locator (URL) associated with the software application, may be listed, or otherwise made available for purchase or use, in a software application store available online. A user may access the third party software application by clicking on a URL associated with the application, for example. In one embodiment, when a user(s) employing a user device 160 clicks or otherwise accesses the URL, the user(s) is/are directed to a webpage hosted by collaborative development service 130.

Figure 18:
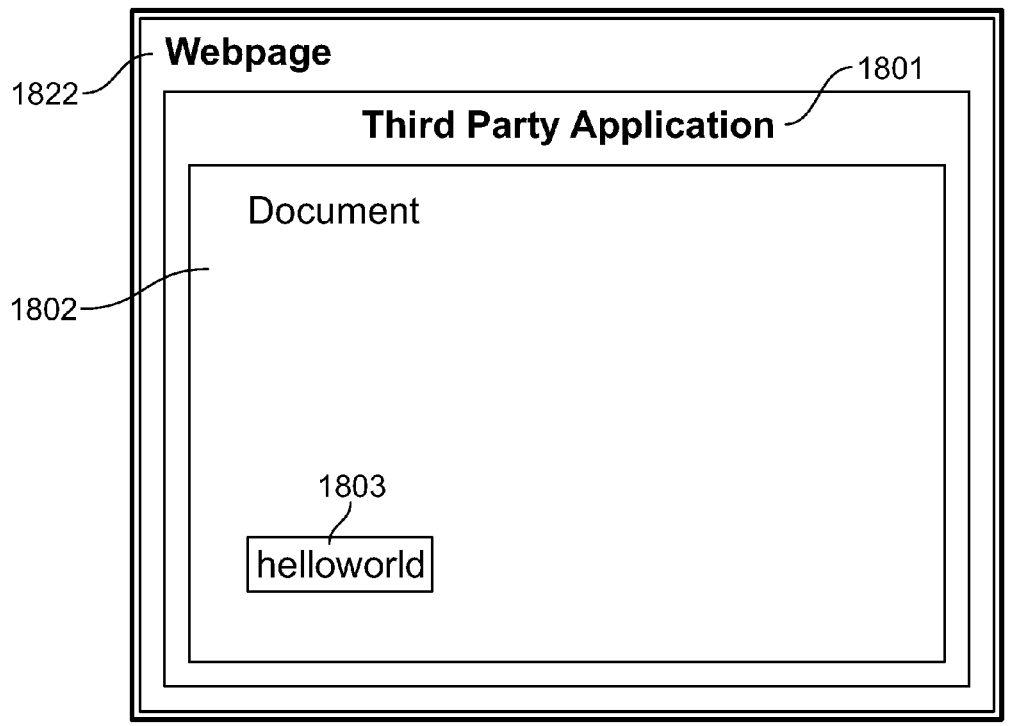
FIG. 18 shows a third party application, and a document created using the third party application, displayed in a frame embedded in a webpage in accordance with an embodiment.

FIG. 18 shows a third party software application 1801 embedded on a webpage 1822, which may be displayed on a user device 160. The user(s) may use the third party application 1801 to create a document 1802, which may be displayed to the users in the same embedded IFrame or in a second IFrame on the webpage hosted by collaborative development service 130. In one embodiment, document 1802 may be visible to the users while third party application 1801 may be running in the background and thus invisible to the users. Therefore, third party application 1801 illustrated in the figures may or may not be visible to a user.

In one embodiment, when the user clicks on a URL associated with the third party software application, the user downloads the application or otherwise loads the application onto his/her user device. The application may then be represented as an icon, or appear as a new menu item in a list of items on a webpage hosted by the collaborative development service 130. The webpage may list, for example, all applications purchased and/or downloaded by the user. The application is loaded onto the user's browser as an embedded IFrame in a manner such as that described above, and a document created using the application may be accessed by the user at anytime using any one or combination of a number of devices having access to the Internet.

Figure 19A:
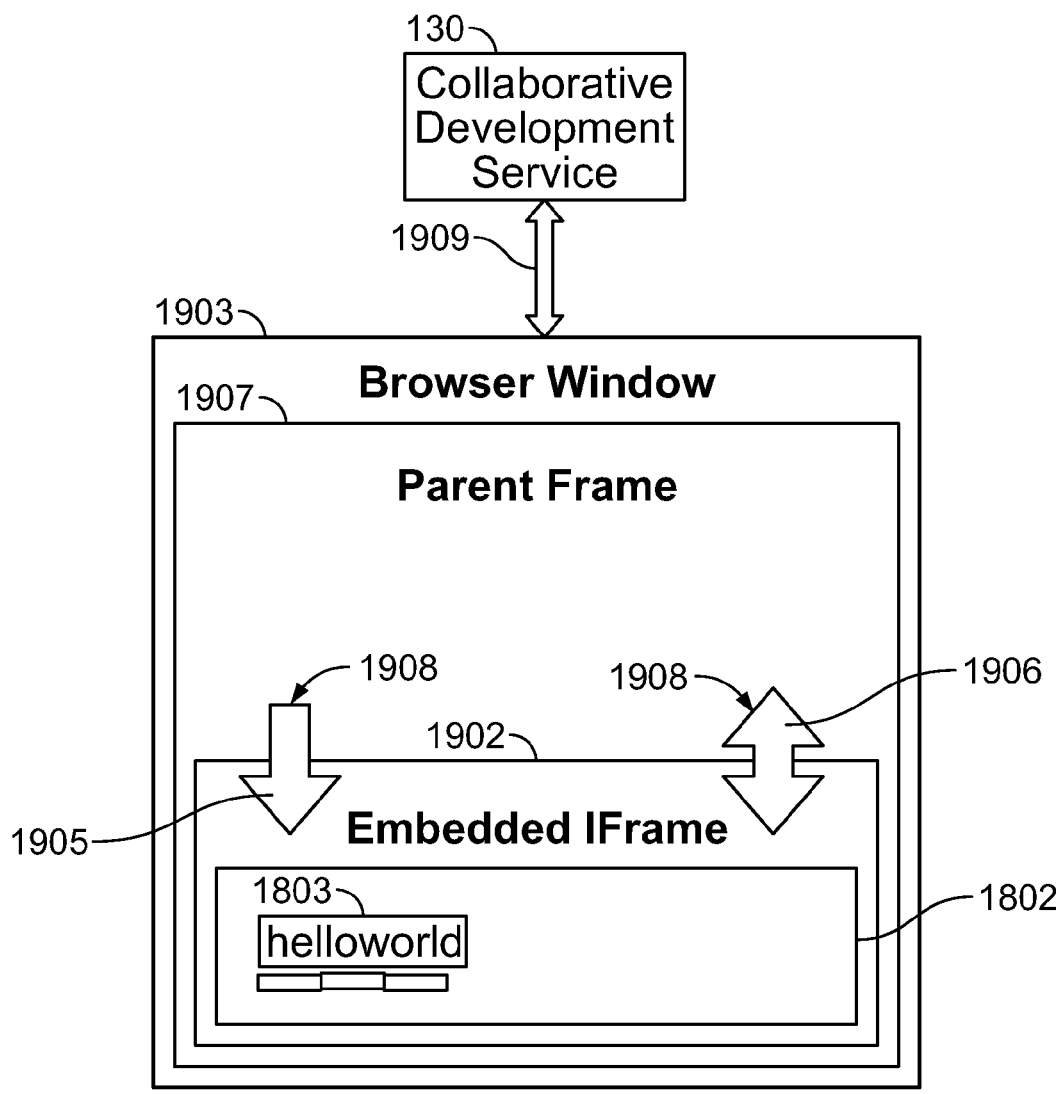
FIG. 19A illustrates an example of interframe communication in accordance with an embodiment.

In an embodiment illustrated in FIG. 19A, collaborative development service 130 communicates with a user's browser window 1903, which displays a parent webpage 1907 (the parent frame) and an embedded IFrame 1902. In one embodiment, the webpage is hosted on collaborative development service 130, while the source of the IFrame (e.g., the third party application) is hosted on a third party server associated with the third party application.

Browser window 1903 includes a parent frame 1907 and an embedded IFrame 1902. In one embodiment, browser window 1903 may include one or more frames that contain the same universal information as browser window 1903 (or parent frame 1907), regardless of what application is embedded within IFrame 1902.

Browser window 1903 communicates with embedded frames using interframe communication. In order for browser window 1903 to communicate with embedded IFrame 1902, event notifications are sent in the direction shown by 1905. Event notifications may be sent without an explicit request and include mutations, as described above, received from collaborative development service 130 and information about users that have joined and/or left the document. This one-way communication of events allows for a secure system.

Remote procedure calls (RPCs) 1906 are sent to and/or from the browser window 1903 to embedded IFrame 1902. The RPCs may be in the form of requests that are sent from a developer code/application document to parent frame 1907. The RPCs may also be responses that are sent back from the parent code to the developer code including document mutations, request for information about users, etc. Methods of interframe communication are known.

Figure 19B:
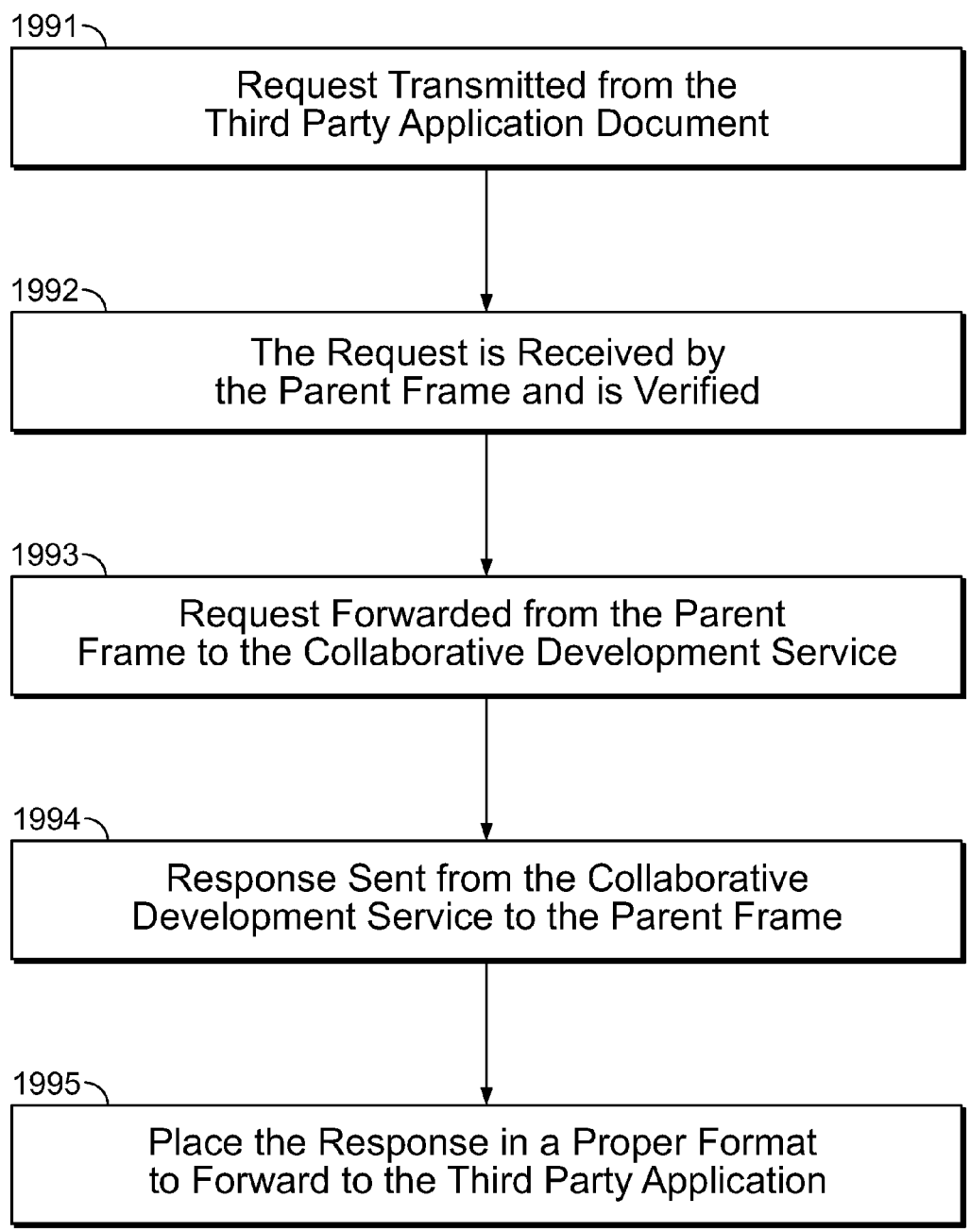
FIG. 19B is a flowchart of a method of providing collaborative development services in accordance with an embodiment.

In one embodiment, a third party application and/or a document embedded on IFrame 1902 communicates with parent frame 1907 using cross-frame messaging which passes messages between parent frame and collaborative development service 130. In one embodiment, for purposes of security, mutations generated by a third party application embedded in the IFrame are prohibited from directly communicating with collaborative development service 130. In this way, security measures are implemented to ensure that untrusted, unverified or otherwise unsecure data is not transmitted directly to collaborative development service 130. FIG. 19B is a flowchart of a method of communicating between a third party application embedded in an IFrame and collaborative development service 130. First, a request is transmitted from the third party application document embedded in IFrame, at step 1991. The request may be a question or a mutation on the third party application document. For example, the request may contain a mutation or a question regarding the users that are accessing or have accessed the third party application. The request may be a stream of information or any other type of request. The request is sent from the third party application document embedded in the IFrame to parent frame 1907 and/or webpage via interframe communication (shown as 1908 in FIG. 19A). The request is received by parent frame 1907 and is verified and/or otherwise determined to be secure, at step 1992.

The request is then forwarded from the trusted parent frame 1907 to collaborative development service 130, where the request may be handled appropriately, at step 1993. In one embodiment, the request (or message containing the request) is communicated via asynchronous Javascript and Extensible Markup Language (XML) (shown as 1909 in FIG. 19A). Additionally, a response to the request is also communicated via asynchronous JavaScript and XML (shown as 1909 in FIG. 19A). The response is sent from collaborative development service 130 to parent frame 1907, at step 1994, which places the response in a proper format to forward to the third party application, at step 1995.

In one embodiment, a one-way communication is made from parent frame 1907 to the third party application. This communication may relate to any event including a notification sent without an explicit request including mutations received from collaborative development service 130, and information about users (whether a user has joined or left a third party application document), etc. The methods and systems as depicted by FIGS. 19A and 19B provide real-time scripting.

Application of Operational Transformation Rules

Referring again to FIG. 18, a plurality of users use the functionality of third party application 1801 to create a document 1802. Within the document, the users may define instances of particular objects, including word object instances. In an embodiment illustrated by FIG. 20, the users instantiate a word object "helloworld" 1803.

Figure 20:
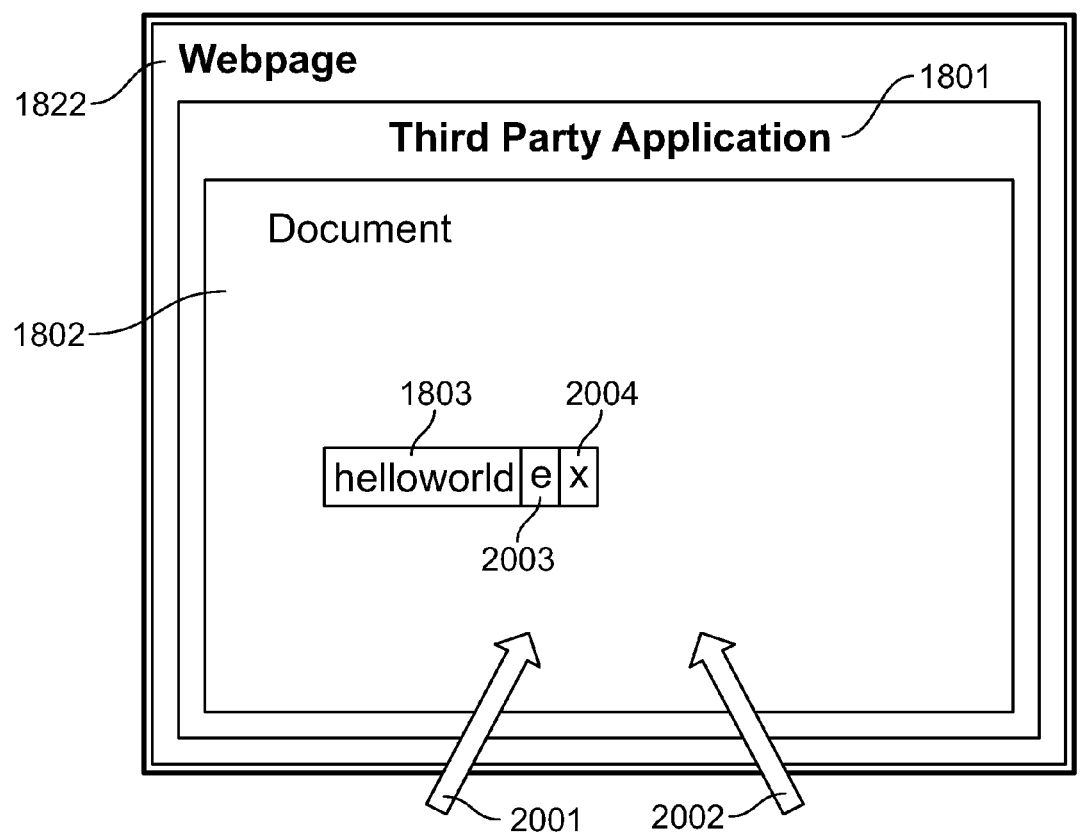
FIG. 20 shows a document displayed in an embedded frame in accordance with an embodiment.
Figure 21A:
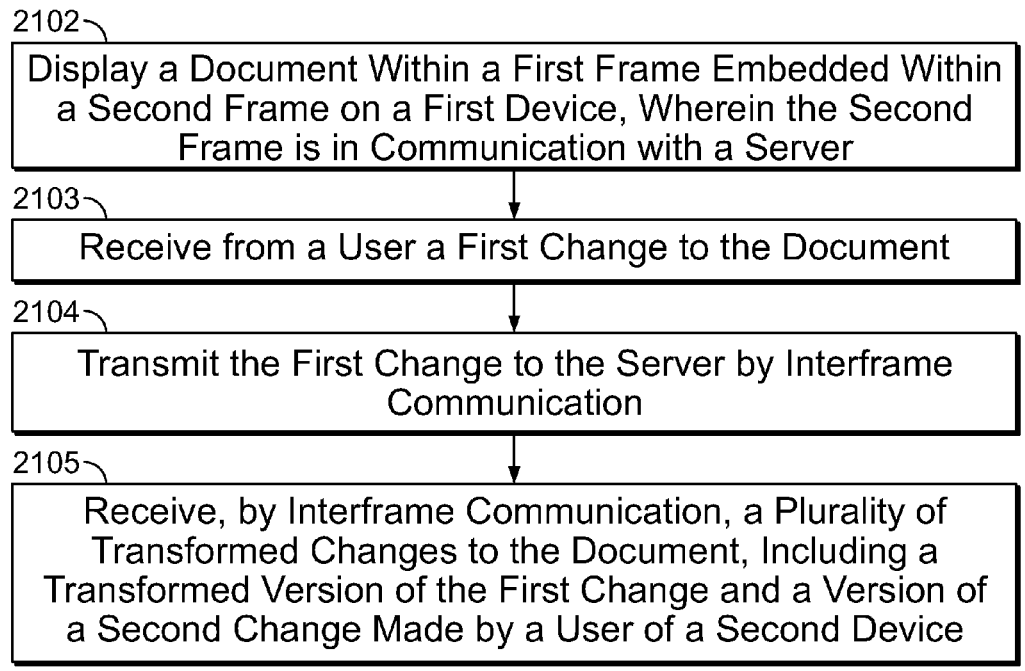
FIG. 21A is a flowchart of a method of providing collaborative development services in accordance with an embodiment.
Figure 21B:
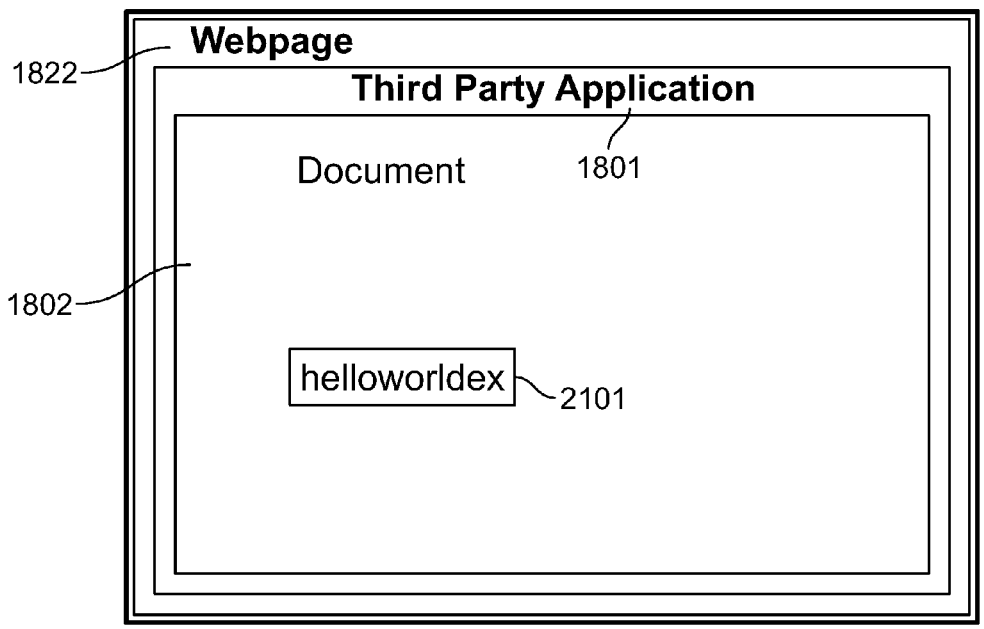
FIG. 21B shows a document displayed in an embedded frame in accordance with an embodiment.
Figure 22:
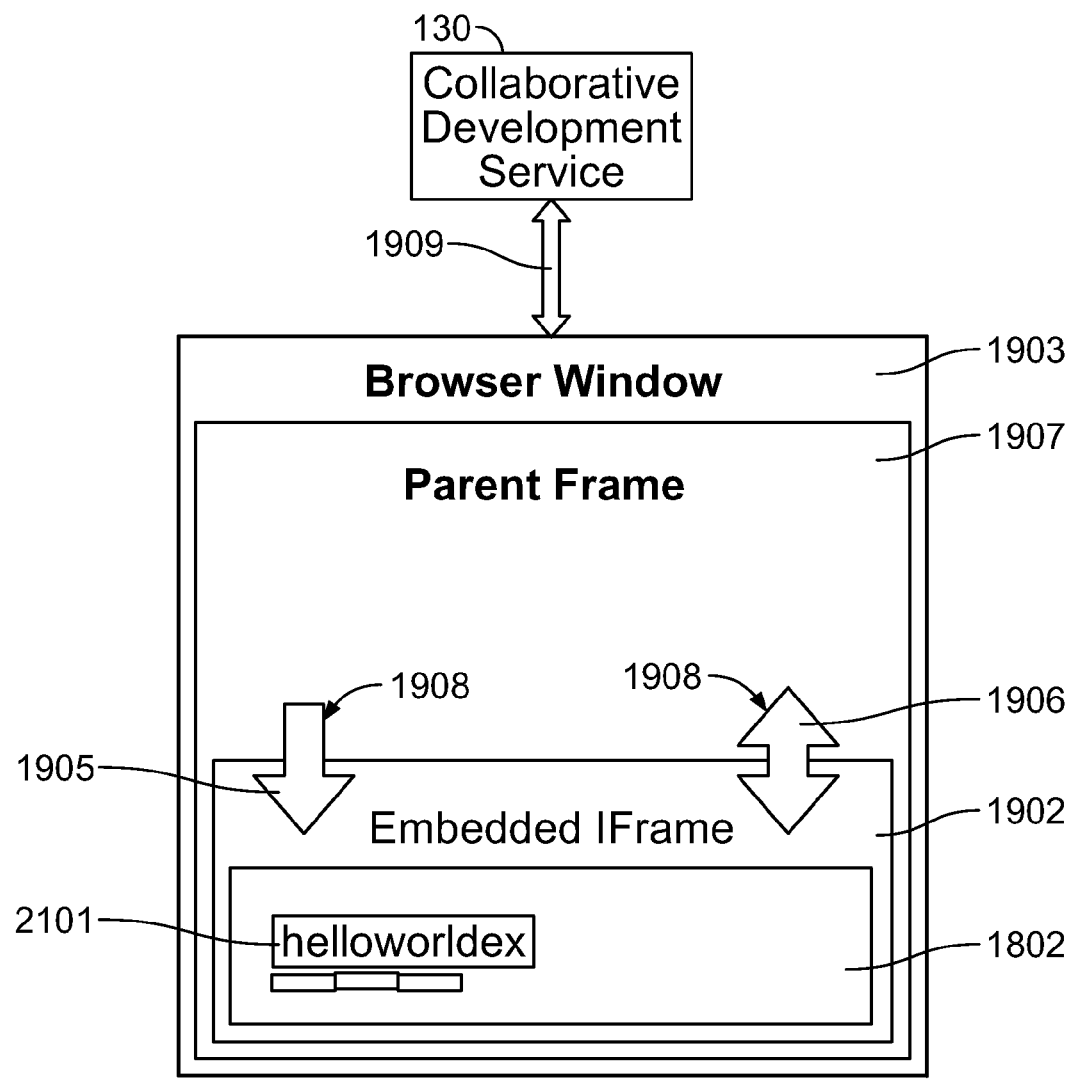
FIG. 22 shows an embedded IFrame containing an updated document in accordance with an embodiment.

The plurality of users subsequently send respective instructions 2001 and to edit object instance "helloworld" 1803, in FIG. 20. In one embodiment, a first user may send instruction 2001 to append the letter "e" (2003) at the end of "helloworld." Substantially simultaneously, a second user may send instruction 2002 to append the letter "x" (2004) at the end of "helloworld." As both the instructions 2001 and 2002 are sent and/or received at approximately the same time, operational transformation rules may be applied, in a manner such as descried above. Further, instead of redrawing the object instance twice to append letters "e" and "x," only a single redraw combining both the letters "e" and "x" may be determined and performed in a manner such as described above. As such, "e" and "x" are appended to the object instance "helloworld" and an updated object instance "helloworldex" 2101 is displayed, as shown in FIG. 21B. Specifically, the visual representation of object instance 2101 displayed in the embedded IFrame within each of the user's browser windows is updated, as shown in FIG. 22.

Communication is carried out among frames on user device 160, and between user device 160 and collaborative development service 130, in order to implement changes received by the user of the user device as well as changes received by users of other devices. FIG. 21A is a flowchart of a method of providing collaborative development services in accordance with an embodiment. At step 2102, a document is displayed within a first frame embedded within a second frame on a first device, wherein the second frame is in communication with a server. For example, a document being edited using a third party software application may be displayed within a first frame embedded within a second (parent) frame on user device 160-A, in communication with collaborative development service 130. At step 2103, a first change to the document is received from a first user. A user of user device 160-A may edit an object instance such as a word within the document. At step 2104, the first change is transmitted to the server by interframe communication. The first, embedded frame displayed on user device 160-A communicates the change to the parent frame, which transmits an instruction specifying the change to collaborative development service 130. Collaborative development service 130 generates a plurality of transformed operations, based on the user's specified change and on changes introduced by a second user of a second user device, in the manner discussed above. Collaborative development service 130 communicates the transformed operations to user device 160. At step 2105, a plurality of transformed changes to the document, including a transformed version of the first change and a version of a second change made by a user of a second device, are received by interframe communication. The parent frame receives the information specifying the transformed operations, and communicates the operations to the third party application via the embedded frame. The transformed changes are applied to the visual representation of the document.

Figure 23:
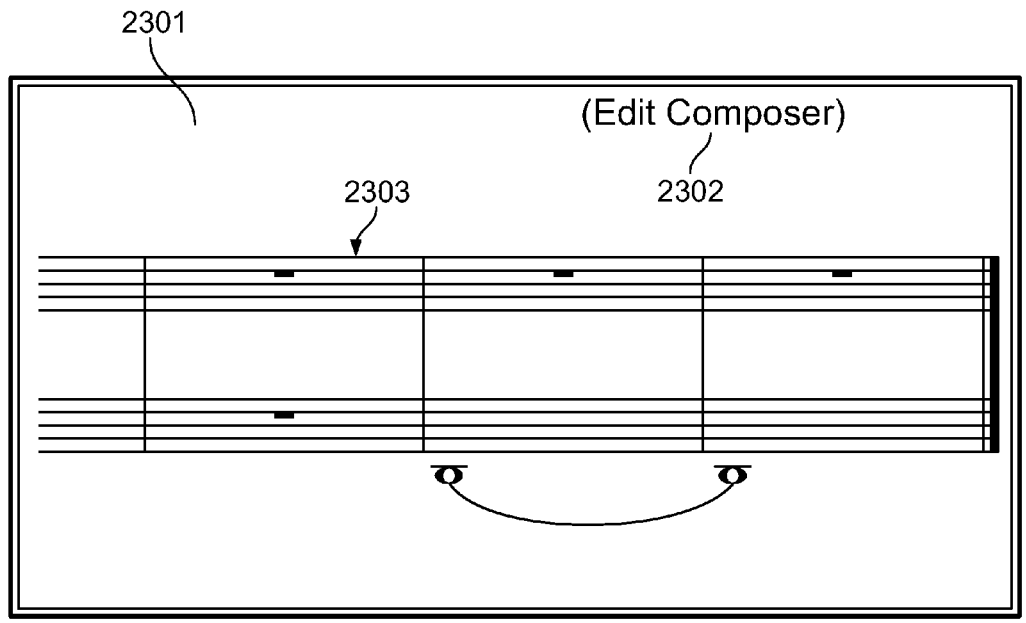
FIG. 23 shows a music editor document in accordance with an embodiment.

Another embodiment in which multiple users use collaborative development service 130 to collaboratively edit a document is illustratively depicted in FIG. 23. FIG. 23 shows a document that may be created using a third party software application, in this case, a music editing application. Document 2301 is presented to each user as an embedded IFrame within a webpage on the user's device. The application may exist in the background and may not be visible to the users. Therefore, the users are able to view document 2301 which includes a staff 2303, text 2302, etc., output on their devices.

In this embodiment, a plurality of users wish to collaborate to write a song. The users may access a blank or partially filled staff-sheet within document 2301. While the users are creating and editing the song, an indicator such as 2302 may indicate to the users that they are in an editing mode. Thus, the users may see text, graphics, etc. stating "Edit Composer" or the like.

Figure 24:
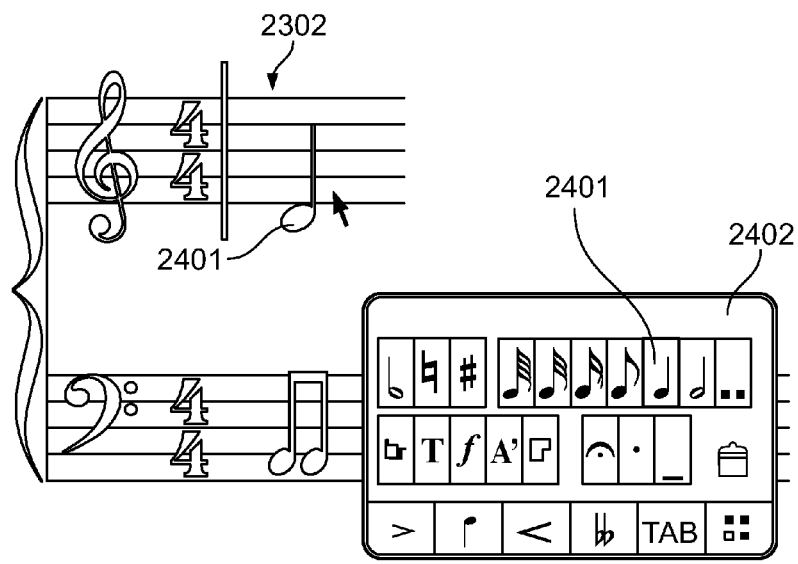
FIG. 24 shows a music editor document in accordance with an embodiment.

In one embodiment, two users, Jan and Joey, wish to compose a new song together. Jan and Joey are located 500 miles apart from each other and wish to use collaborative development service 130 to create their new song. Jan and Joey may place musical notes on the staff by clicking on a location and placing the note on that location. As shown in FIG. 24, when Jan or Joey wishes to add a note 2401, he/she clicks on the appropriate note that may appear on a pop-up menu, 2402. The pop-up menu may include a variety of musical notes, etc. In one embodiment, the notes may be placed on staff 2303 by selection of note 2401 from the pop-up menu.

Figure 25:
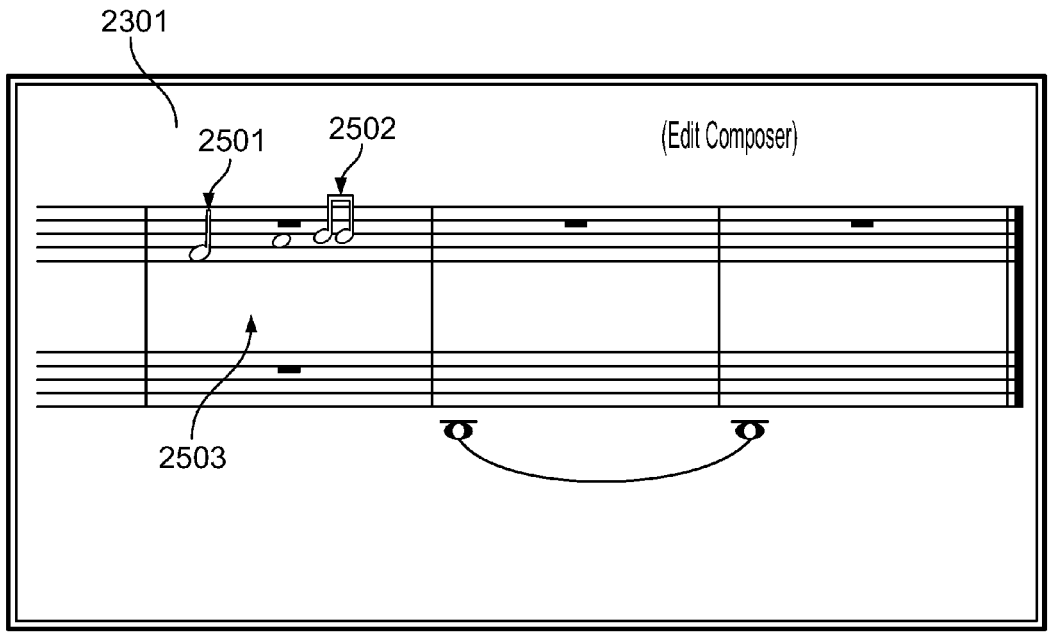
FIG. 25 shows a music editor document in accordance with an embodiment.

In one embodiment illustratively depicted by FIG. 25, Jan wishes to place a note 2501 on the staff at the beginning of a measure 2503 and Joey, substantially simultaneously, wishes to place a note 2502 at the end of measure 2503. In one embodiment, operational transformation rules are applied to the users' changes in a manner such as that described above yielding the results shown in FIG. 25.

Figure 26:
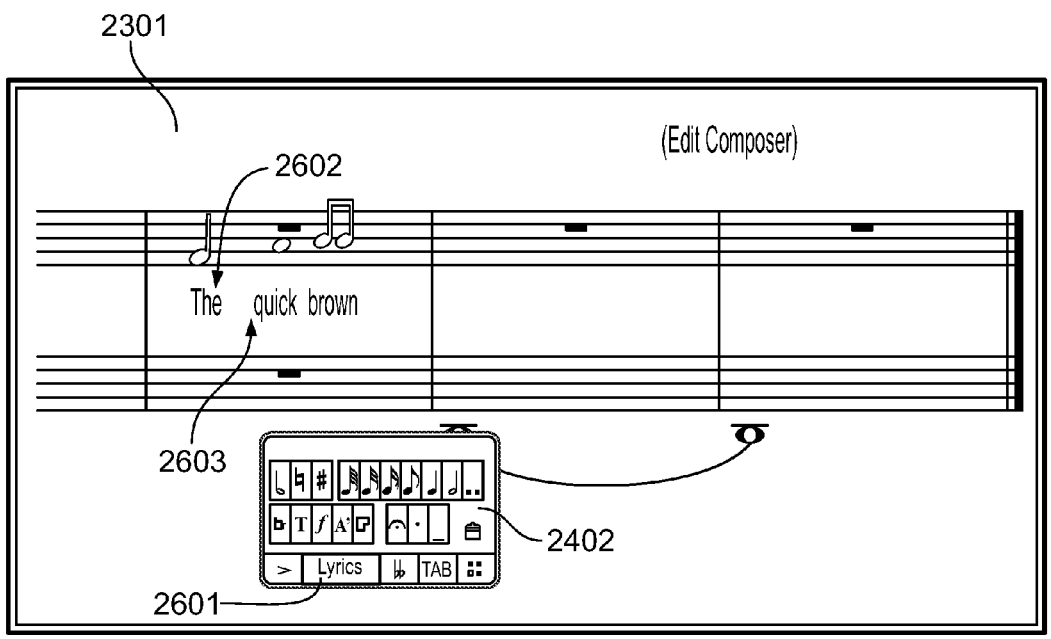
FIG. 26 shows a music editor document in accordance with an embodiment.

Jan and Joey now insert lyrics into the song. The lyrics correspond to the notes. Specifically, Jan and Joey may select an icon 2601 labeled "lyrics" to insert the desired lyrics on of the staff as shown in FIG. 26. In one embodiment, Joey has inserted a word "The," in a location shown by 2602 before the word "brown" that was previously placed on the bottom of the staff. Jan then wishes to place the lyrics "quick" at location 2603 also before the word "brown." One or more operational transformation rules are applied, in a manner such as that described above, to Jan and Joey's changes, and the phrase "The quick brown" is produced. After the operational transformation rules have been applied, the visual representation shown on Joey's computer and Jan's computer and the corresponding representation on the server of the collaborative development service 130 are consistent. For example, both Jan and Joey's computer may display the result shown in FIG. 26.

Figure 27:
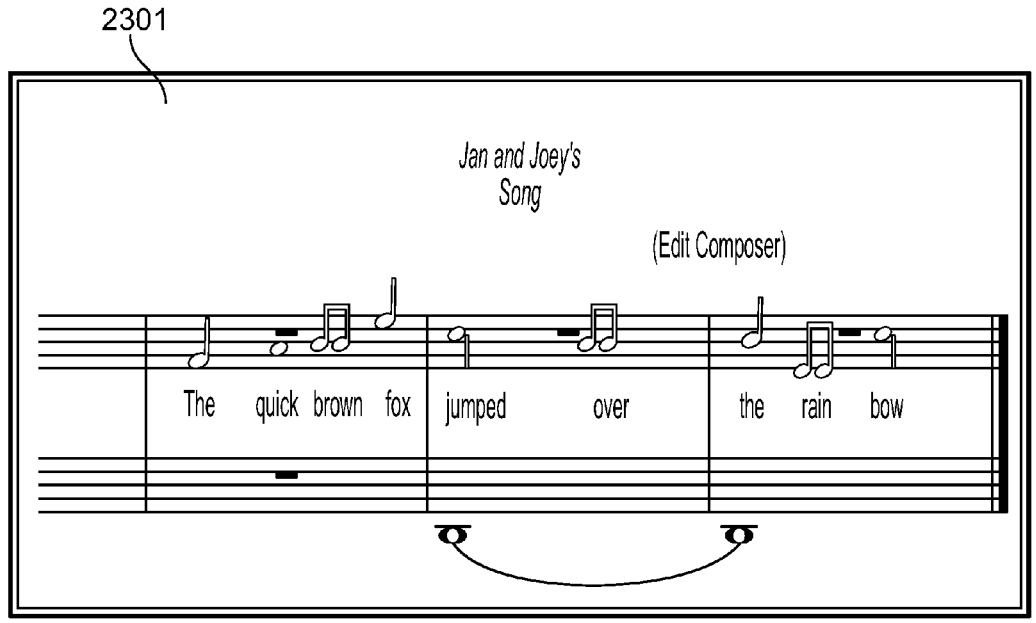
FIG. 27 shows a music editor document in accordance with an embodiment.

At this point, Jan and Joey may collaborate further to complete their song, as depicted by FIG. 27. Jan and Joey also collaborate to create the title of their song which is "Jan and Joey's Song." In one embodiment, Jan and Joey wish to create and/or edit the title of the song substantially simultaneously and operational transformational rules are applied in such a manner as described above. Referring to FIG. 27, Jan and Joey have completed their song collaboratively and their visual displays have been updated in real-time during the collaboration.

Figure 28:
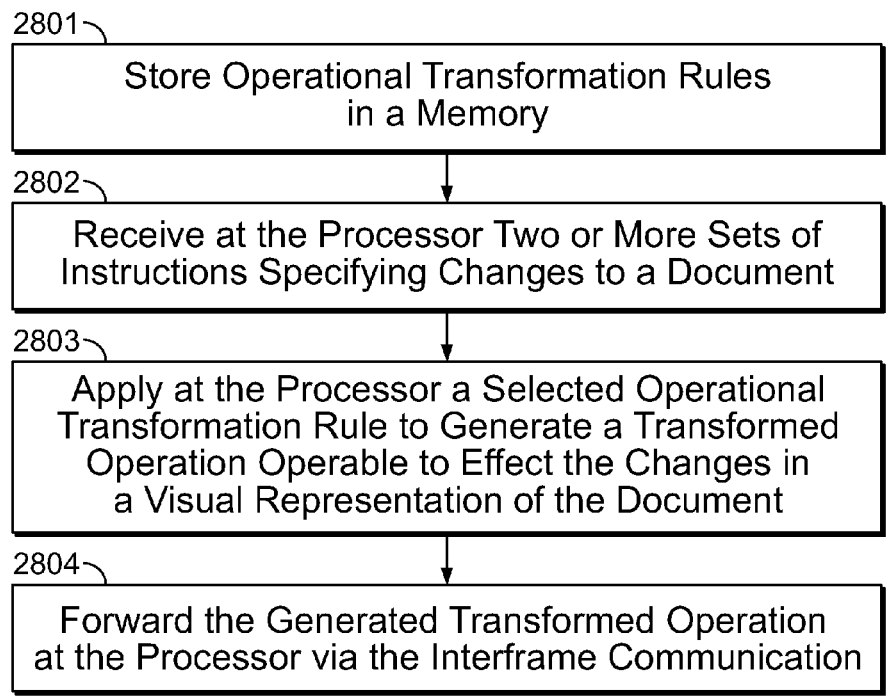
FIG. 28 is a flowchart of a method of providing collaborative development services in accordance with an embodiment.

FIG. 28 is a flowchart of a method of providing collaborative editing services. Operational transformation rules are stored in a memory, at step 2801. The processor, which is in communication with the memory, receives, via interframe communication, two or more sets of instructions, specifying respective changes to the document, at step 2802. The two or more sets of instructions may be received substantially simultaneously in real-time. At the processor, a selected operational transformation rule is applied to generate a transformed operation that effects the changes specified by the two or more sets of instructions in a visual representation of the document, in a consistent manner, at step 2803. At the processor, the generated transformed operation is forwarded via interframe communication, at step 2804.

In one embodiment, Jan wishes to make a change to the musical notes editor document and sends instructions to the document indicating the change she wants to make. The change is communicated by RPCs from the application document to the parent frame to a server(s) of collaborative development service 130. In this way, even though Jan has changed some part of the song she is writing locally, the change does not go into effect on all user devices (such as Joey's user device) until the change has been accepted by collaborative development service 130. Such hierarchy ensures the safety of collaborative development service 130 (and/or a server associated with collaborative development service 130) as each user is prohibited from directly communicating with collaborative development service 130. Additionally, such a hierarchy protects against malicious attacks by an untrusted party.

Additionally, users are provided with the following features. Such features may be available to user, of any third party application that is created and accessed using collaborative development service 130.

Chat

In one embodiment, users are collaborating on a creating a project, such as writing a song, may utilize a chat feature. In one embodiment, users may wish to conduct a transient discussion on the side of the application in a chat window, for example. The chat window may be located anywhere on the users' screens.

Revision History

In one embodiment, users may view all changes made to a document by viewing the revision history. The revision history may show a time stamp of when edits were made. For example, if Joey deleted notes and lyrics from the music editor document, Jan may view the revision history indicative of Joey's edits. Thus, Jan and Joey may access any version of the document at anytime. In one embodiment, Jan and Joey are provided with a list of actions performed including the name of the user that performed the action, the date and time the action was performed and what the user did. If Jan wishes to access lyrics that were created for the song in the past, she may do so at any time without affecting the current state of the song. Also, Jan may restore the song to an earlier state and have the option of restoring it to the current state or any other state at any time.

Users may access other functions, and the revisions are not limited to revisions to text. The revision history function may also show any comments created by the users. In one embodiment, the users may revert to an earlier version of the document by selecting a particular revision history session. Restoring the document to an earlier version of the document does not delete the current version of the application; rather, all versions are viewable and selectable by the users at any time.

Collaborative development service 130 may be used by enterprise-level clients to manage documents and data. In accordance with an embodiment, an enterprise-level client may specify a policy to govern the management of data and documents. In response, collaborative development service 130 manages the client's documents in accordance with the client-specified policy. For example, if an employee of the enterprise generates a document via collaborative development service 130, the document is managed in accordance with the policy specified by the enterprise. In another example, if an employee of the enterprise creates a software application via collaborative development service 130, the software application, including any related code or other data, is managed in accordance with the policy specified by the enterprise.

An enterprise may, for example, grant various access rights to various categories of employees with respect to documents and data. Certain employees may be granted read-only access, other employees may be granted reading and editing rights, other employees may be granted administrator rights, etc. Referring to FIG. 3, collaborative development service 130 stores and records the access rights in a policy file 3090 in memory 325.

Geo-Location of Data

Figure 29:
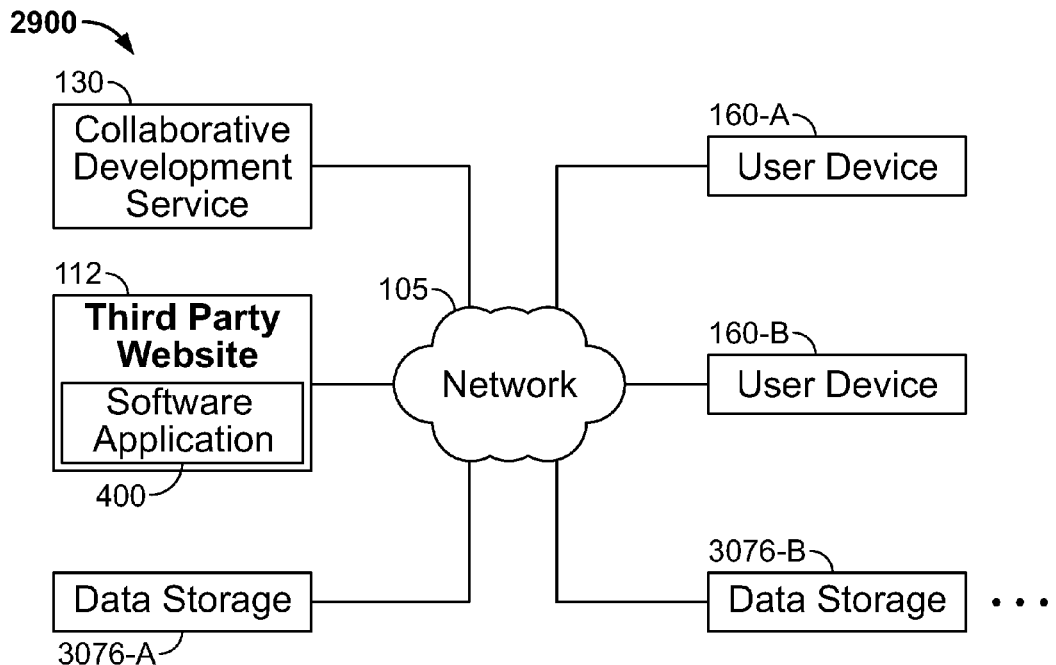
FIG. 29 shows a communication system that may be used to provide data management services in accordance with an embodiment.

For example, in one embodiment, an enterprise may specify a policy governing the storage of data and documents created using collaborative development service 130. FIG. 29 shows a communications system 2900 similar to that shown in FIG. 1, in which collaborative development service 130 maintains, or has access to, multiple data storage facilities located in a variety of countries and jurisdictions throughout the world. Specifically, collaborative development service 130 maintains or has access to data storage 3076-A, data storage 3076-B, etc. Each data storage 3076 may be, for example, a data storage device located in a respective country or jurisdiction. For example, data storage 3076-A may be a data storage device located in Paris, France, data storage 3076-B may be a data storage device located in Sao Paolo, Brazil, etc.

Figure 30:
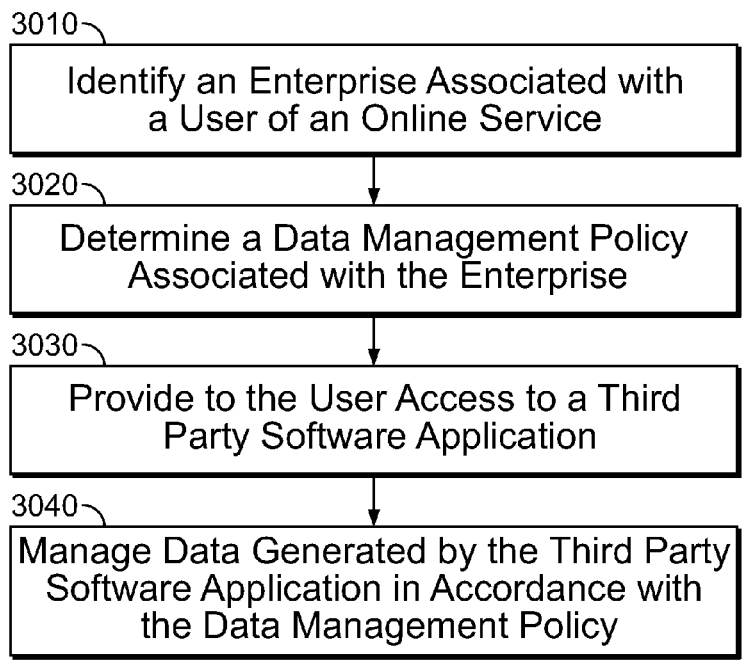
FIG. 30 is a flowchart of a method for providing data management services in accordance with an embodiment.

FIG. 30 is a flowchart of a method of managing data in accordance with an embodiment. Supposing that Enterprise XYZ, an enterprise located in France, wishes to comply with a particular French law requiring that all documents of a certain type be stored within the territory of France, the enterprise may access collaborative development service 130 and specify a requirement that all documents and other data meeting certain criteria must be stored and maintained within the territory of France.

Figure 31:
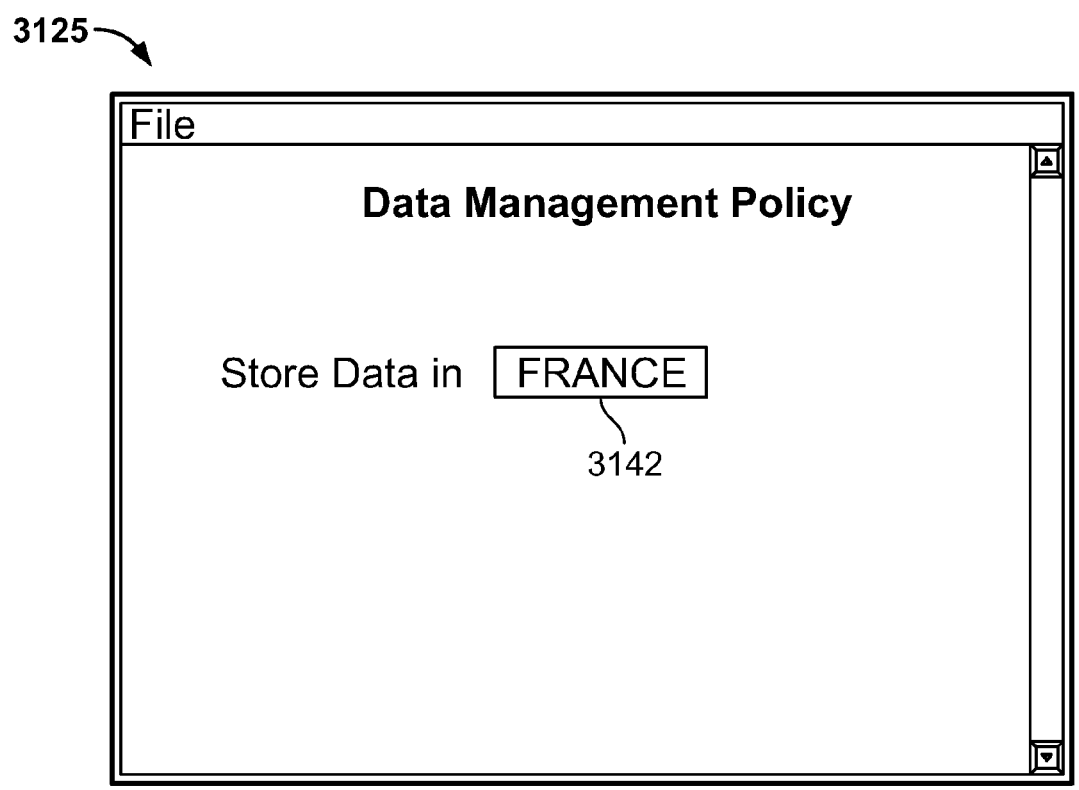
FIG. 31 shows a data management policy web page in accordance with an embodiment.

FIG. 31 shows a data management policy web page 3125 on which a client may specify a data management policy. In the illustrative example, Enterprise XYZ specifies "FRANCE" in a location field 3142, indicating that all data and documents must be stored in France. In other embodiments, other policies may be specified in a similar manner. Referring to FIG. 3, collaborative development service 130 records the enterprise's specified policy in policy file 3090.

The policies established by Enterprise XYZ are now applied to data, documents, and software generated by any employee of the enterprise. At step 3010, an enterprise associated with a user of an online service is identified. Thus, when an employee of Enterprise XYZ accesses collaborative development service 130, collaborative development service 130 determines that the employee is associated with Enterprise XYZ. For example, collaborative development service 130 may identify the individual as an employee of Enterprise XYZ based on his or her username. At step 3020, a data management policy associated with the enterprise is determined. Collaborative development service 130 accordingly retrieves from memory data defining the data management policy of Enterprise XYZ. In this example, collaborative development service 130 retrieves the policy specifying that certain data must be stored in France.

At step 3030, the user is provided access to a third party software application. In the illustrative embodiment, the employee accesses third party application 400 via collaborative development service 130 in the manner described above, and generates one or more documents. The employee may collaborate with other employees of Enterprise XYZ to edit the documents in a collaborative manner, as described above. For example, the employee, and one or more of the employee's co-workers, may access third party software application 400 via collaborative development service 130 and create a text document. The employee and his or her co-workers may subsequently edit the document in a collaborative manner, in the manner described above. In other embodiments, the employee and his or her co-workers may create and edit other types of documents associated with other content types.

At step 3040, data generated by the third party application is managed in accordance with the data management policy. Accordingly, when the employee accesses third party software application 400 and creates a document meeting the criteria specified in the policy, collaborative development service 130 stores the document in a storage device located in the location specified by the policy, for example, in France. If the employee edits the document, all versions and copies of the document are stored within the territory of France. If the employee accesses third party application 400 and generates other data (or software) that meet the policy's specified criteria, the data is stored within the territory of France, in accordance with the policy of Enterprise XYZ.

Tracking and Auditing

In another embodiment, users collaborating to edit a document may each view and track certain information concerning the other users. Such information may include, for example, the date and time another user joined and left the collaboration (i.e., accessed a document or software application), presence information relating to another user in the document or application, activities of another user, revisions made by another user, and another user's audit trail. Collaborative development service 130 may provide such data based on information stored in activity table 428, for example. Additionally, a user may view the location of another user's cursor in the document in real-time.

Collaborative development service 130 also provides an auditing service whereby specified documents and data may be analyzed based on criteria specified by the client to determine whether the management of the documents and data are in compliance with the client's policies, or whether the documents or data are in compliance with any other rules or regulations. Collaborative development service 130 also provides an encryption service that may be used in connection with an audit of the client's documents and data. For example, in response to a client request that specified documents and data (pertaining to an audit) be encrypted, collaborative development service 130 identifies the requested documents and data, and encrypts the documents and data.

E-Discovery

In accordance with an embodiment, a client may direct that collaborative development service 130 identify data and documents meeting certain criteria and produce such data and documents in electronic form. This service may be used, for example, by an enterprise involved in a litigation, in response to a discovery request received from an adversary. The enterprise may specify one or more criteria to be used as a basis for identifying relevant documents. For example, an enterprise may request that a search be performed to identify all documents that contain the name "John Doe," all design documents pertaining to a particular product, etc.

The enterprise may accordingly access collaborative development service 130 and specify one or more criteria. In response, collaborative development service 130 searches the client's documents and other data based on the specified criteria, and provides the documents and data resulting from the search to the client. The results of the search may be provided in any one of a variety of formats, such as a list of documents, a database containing list of links to documents, etc.

Full-Text Indexing

In another embodiment, collaborative development service 130 provides a full text indexing capability to clients. For example, any part of a document maintained at collaborative development service 130 may be indexed for use in a full-text indexing search, regardless of the content type. In one embodiment, the indexing may be performed automatically with respect to all user-entered text. In order to perform full-text indexing, optical character recognition (OCR) or the like may be implemented with respect to newly created text or other items input by users. This service may allow a client to perform a keyword search. Such capabilities may be provided automatically to clients by collaborative development service 130. In another embodiment, full-text indexing may be provided with respect to non-text content.

Unlike existing methods and systems, the systems and methods described above advantageously allow an enterprise-level client of an online document processing service, such as collaborative development service 130, to establish policies that are applicable to all or a selected portion of the client's data and documents. Advantageously, auditing and verification services are also provided.

Discussion

In accordance with an embodiment, employees of a client may use a discussion feature to attach comments relating to a particular node of an object within a document. A discussion thread may also be attached to a particular node of an object. The comment or discussion thread is attached to the particular node. Comments and discussion threads may be added in this manner within a document regardless of the content type. For example, in a text document, an employee may place his or her cursor at a particular character in a text document and attach a comment to that particular character. In an image, an employee may place a cursor at an object within the image and attach a comment or discussion thread to the object. An employee developing a software application may attach a comment or discussion thread to a selected component of a data model.

Offline Support

In accordance with an embodiment, a document and related data may be stored in a user device 160, to enable a user of the user device to edit the document while offline. For example, documents may be stored locally on a user device using HTML5 offline storage.

Garbage Collection

In accordance with an embodiment, collaborative development service 130 performs a data cleanup function (also referred to as a "garbage collection" function) to manage the removal of unused data stored in user devices 160. In an illustrative embodiment, each data model maintained at collaborative development service 130 includes a root object to which all other objects are linked either directly or indirectly. Data that is not linked to the root object is deemed to be unused, and therefore unnecessary.

In an illustrative embodiment, each user device 160 maintains a copy of data model 450, and collaborative development service 130 performs a background garbage collection function to remove unused data within data model 450. For example, collaborative development service 130 may from time to time examine data model 450 to identify data that was previously generated within the data model but which is no longer linked to the root object.

Referring again to FIG. 4A, suppose that word object instance 424 ("helloworld") appears or is referenced at two separate locations within document 410. Now suppose that a first user employing user device 160-A deletes the first use of, or reference to, word object instance 424 from document 410, and that a second user employing user device 160-B deletes the second use of, or reference to, word object instance 424 from document 410. The object instance is accordingly deleted from the document and is no longer linked to the data model's root object. However, under some circumstances the alphanumeric character string "helloworld" may remain in its memory location, disconnected from data model 450. Accordingly, while performing a background garbage collection routine, processor 375 of collaborative development service 130 may identify the alphanumeric string of word object "helloworld" which still resides in memory and is not linked to the root object of the data model, and determine that the data is unused and may be removed. Collaborative development service 130 deletes the object from memory, and additionally transmits to each user device 160 an instruction to delete the object from memory. In accordance with an embodiment, each user device 160 stores a copy of document 410. In response to a delete instruction received from collaborative development service 130, each user device 160 performs a local garbage collection function in a manner that enables users to recover data that is removed from memory.

Figure 32:
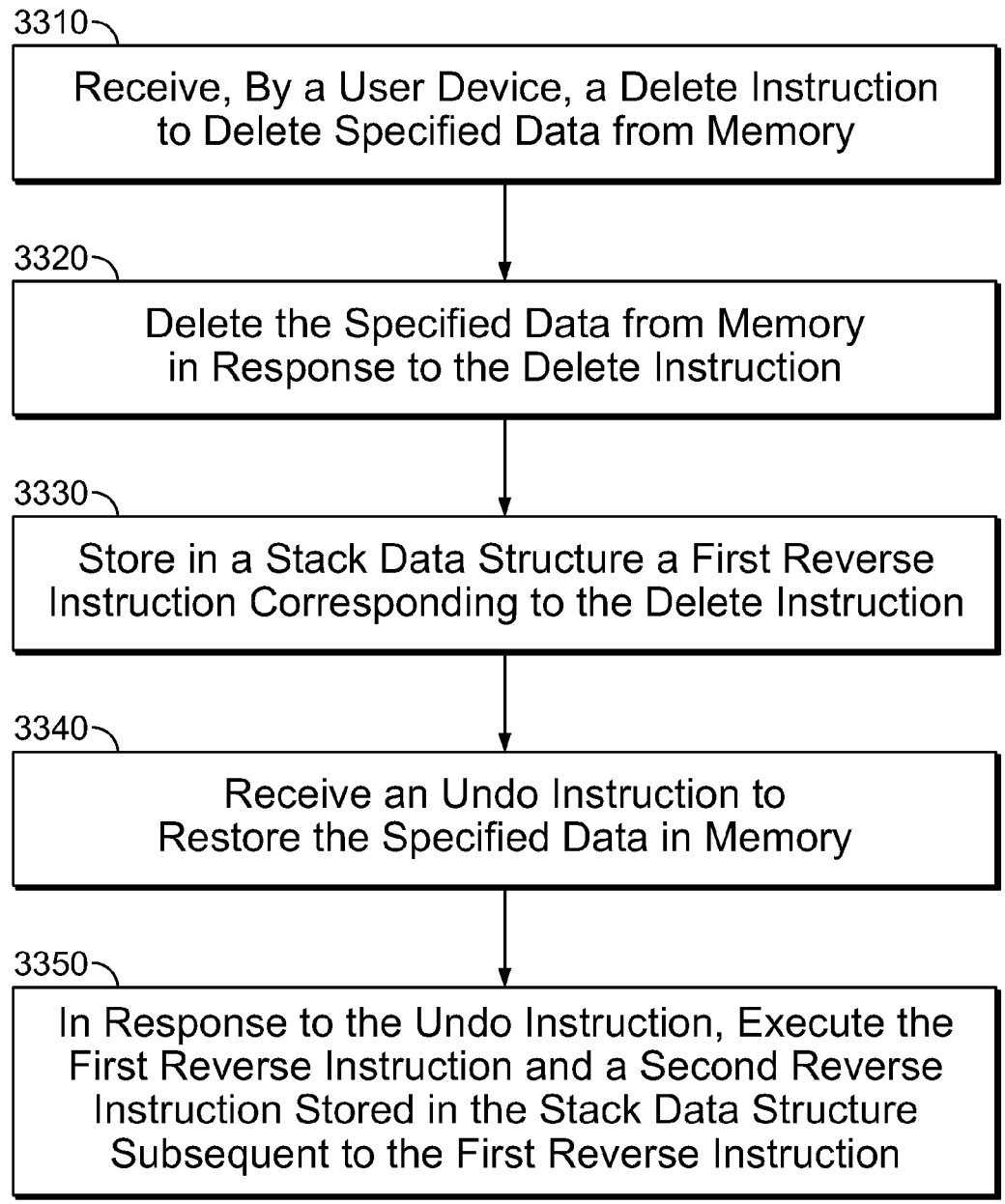
FIG. 32 is a flowchart of a method for managing data in accordance with an embodiment.

FIG. 32 is a flowchart of a method of managing data in accordance with an embodiment. The method described in FIG. 32 is discussed below with reference to user device 160-A; however, it is to be understood that other user devices may also perform the steps described substantially at the same time. At step 3310, a delete instruction to delete specified data from memory is received by a user device. In the illustrative embodiment, user device 160-A receives the instruction to delete the alphanumeric string "helloworld" from memory. At step 3320, the specified data is deleted from memory in response to the delete instruction. User device 160-A accordingly deletes the alphanumeric string "helloworld" from memory.

Figure 33A:
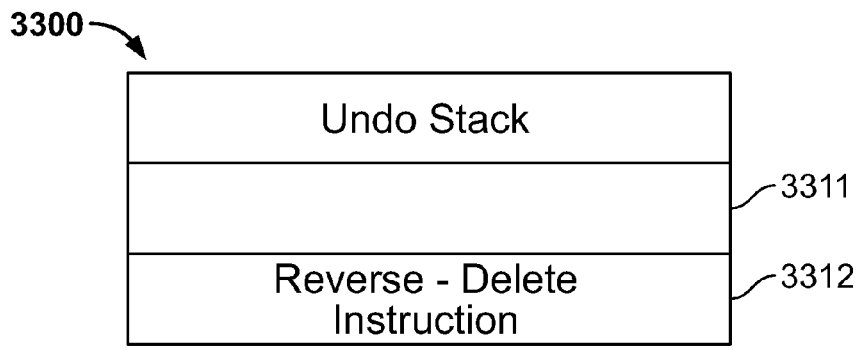
FIGS. 33A-33C show an exemplary undo stack maintained by a user device in accordance with an embodiment.

At step 3330, a first reverse instruction corresponding to the delete instruction is stored in a stack data structure. As discussed above, user device 160-A maintains an undo stack that stores reverse instructions corresponding to various actions performed by the user device. In the illustrative embodiment, user device 160-A now generates a reverse delete instruction corresponding to the instruction to delete the object "helloworld" received from collaborative development service 130, and adds the reverse delete instruction to the undo stack. A reverse delete instruction corresponding to a particular delete instruction includes information that enables the user device to restore the data that was deleted by the particular delete instruction. FIG. 33A shows an example of an undo stack that may be maintained by user device 160-A in accordance with an embodiment. Undo stack 3300 stores reverse instruction 3311, which may relate to an edit made by a user to document 410, for example. After user device 160-A adds a reverse delete instruction corresponding to the received delete instruction, undo stack 3200 includes reverse instruction 3311 and reverse delete instruction 3312, which corresponds to the delete instruction received from collaborative development service 130.

Figure 33B:
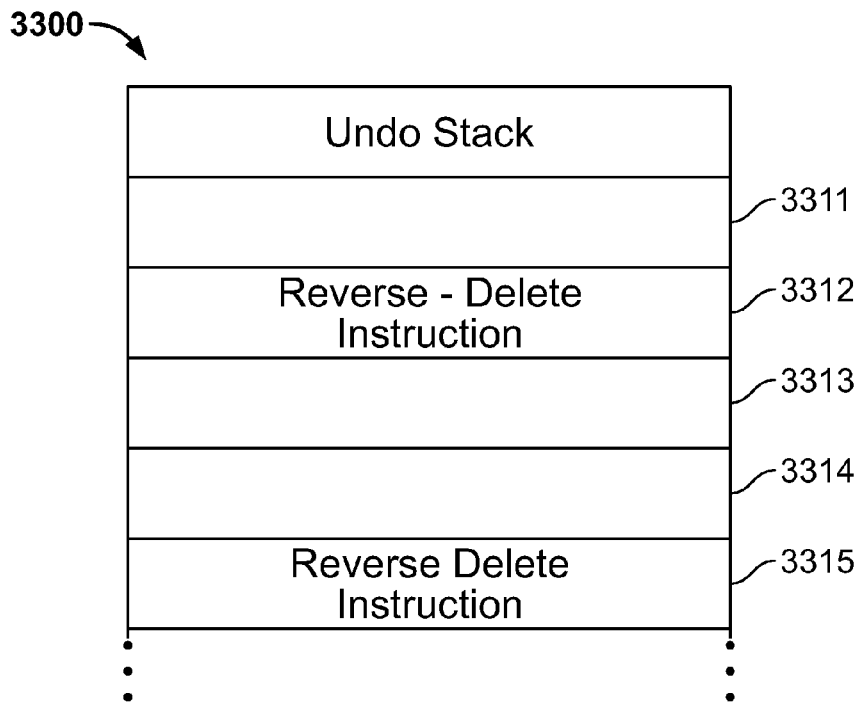

In the illustrative embodiment, user device 160-A from time to time adds other reverse instructions corresponding to various actions performed by the user device, such as changes made to document 410. Referring to the illustrative example of FIG. 33B, after a period of time undo stack 3300 includes reverse instructions 3313 and 3314. Concurrently, collaborative development service 130 continues to perform the background garbage collection routine and transmits to each user device 160 instructions to delete specified data from memory. When such an instruction is received by user device 160-A, the user device deletes the specified data from memory and adds a corresponding reverse delete instruction to undo stack 3300. For example, user device 160-A may add a second reverse delete instruction 3315 to undo stack, as shown in FIG. 33B.

Now suppose that the user employing user device 160-A wishes to restore the word object instance 424 ("helloworld") within document 410. The user selects one or more appropriate options to undo the prior deletion, in the manner described above. At step 3340, an undo instruction to restore the specified data in memory is received. Accordingly, the user's selection is received by user device 160-A.

At step 3350, the first reverse instruction, and a second reverse instruction stored in the stack data structure subsequent to the first reverse instruction, are executed and removed from the stack, in response to the undo instruction. In the illustrative embodiment, reverse delete instructions are executed and removed in reverse chronological order. Accordingly, user device 160-A examines undo stack 3300 and identifies the most recent reverse delete instruction. In this example, the most recent reverse delete instruction is reverse delete instruction 3315. Therefore, user device 160-A executes reverse delete instruction 3315 to document 410, and removes reverse delete instruction 3315 from the stack.

Figure 33C:
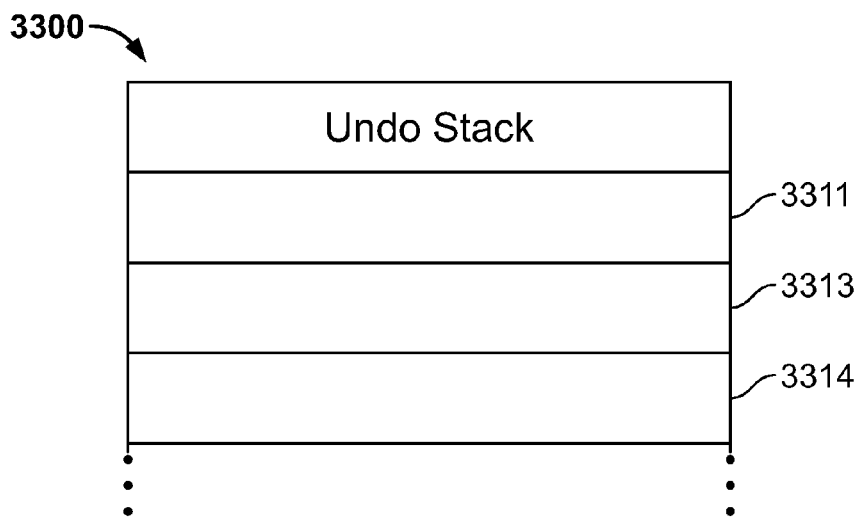

User device 160-A continues to execute and remove reverse delete instructions from undo stack 3300 in reverse chronological order until the user's request is fulfilled. Accordingly, user device 160-A again examines undo stack 3300 and identifies the next most recent reverse delete instruction. The next most recent reverse delete instruction is reverse delete instruction 3312. Therefore, user device 160-A executes reverse delete instruction 3312, and removes reverse delete instruction 3312 from the stack. Because the user's request has now been fulfilled, the process ends. FIG. 33C shows undo stack 3300 after the reverse delete instructions have been removed.

In accordance with another embodiment, collaborative development service 130 assigns a respective fingerprint to each reverse delete instruction to facilitate the management of data. Collaborative development service 130 may generate a fingerprint for each reverse delete instruction, for example. A fingerprint associated with a reverse delete instruction may be any appropriate type of identifier, such as an identifier generated using a random number generator, an identifier generated based on the instruction using a hash function, an identifier selected from a list of consecutive or non-consecutive numbers, etc. Other methods of generating a fingerprint may be used.

Supposing again that a user employing user device 160-A deletes word object instance 424 ("helloworld") from document 410, the object instance is deleted from the document and is no longer linked to the data model's root object. However, the alphanumeric character string "helloworld" remains in its memory location, disconnected from data model 410.

Figure 34:
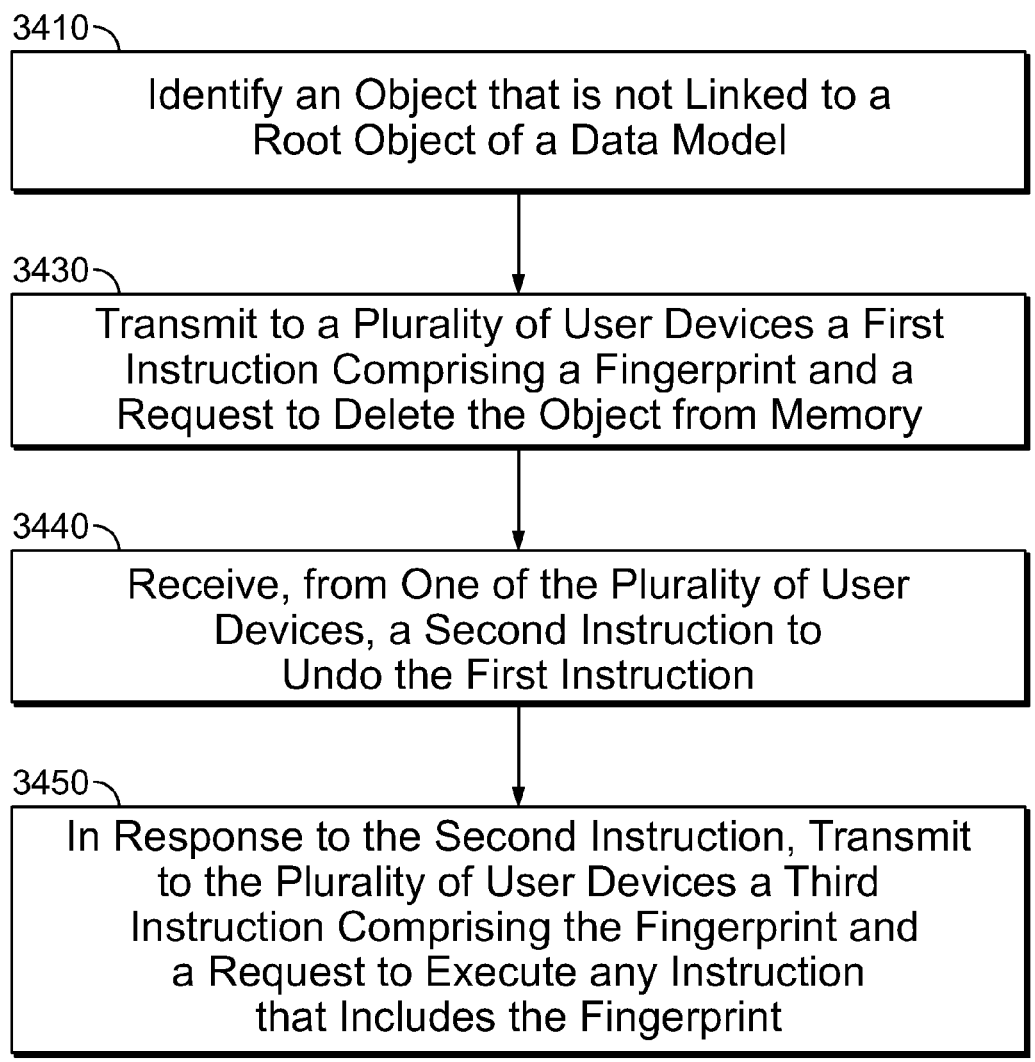
FIG. 34 is a flowchart of a method for managing data in accordance with an embodiment.

FIG. 34 is a flowchart of a method of managing data storage among a plurality of user devices in accordance with an embodiment. At step 3410, an object that is not linked to a root object of a data model is identified. In the illustrative embodiment, while performing a background garbage collection routine, processor 375 of collaborative development service 130 identifies the word object "helloworld" which still resides in memory and is not linked to the root object of the data model.

Figure 35:
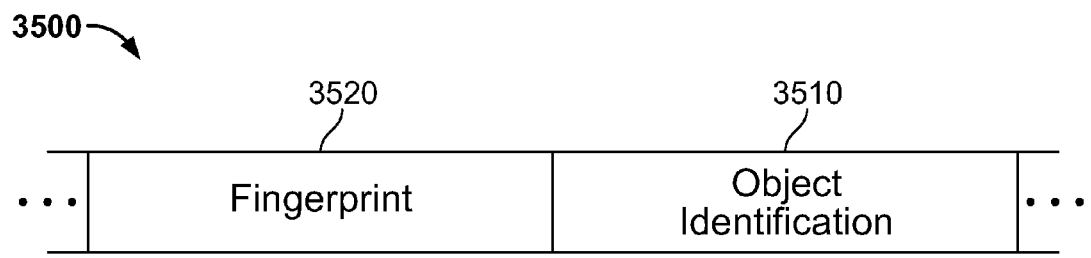
FIG. 35 shows an exemplary delete instruction in accordance with an embodiment.
Figure 36:
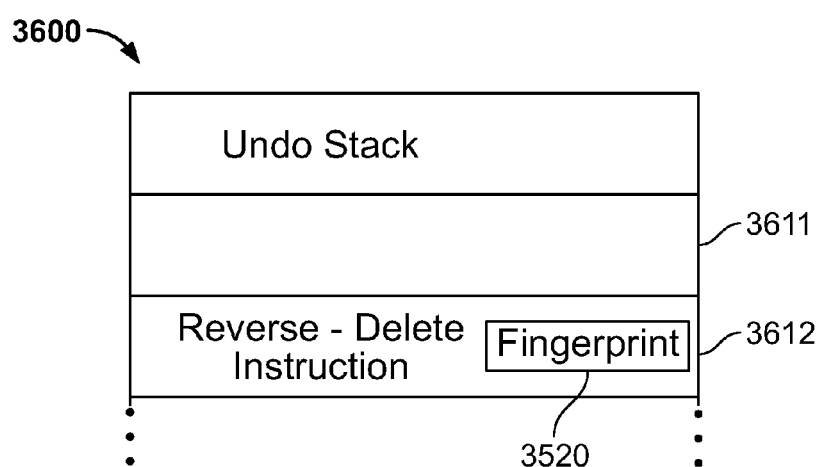
FIG. 36 shows an exemplary undo stack in accordance with an embodiment.

At step 3430, a first instruction, comprising a request to delete the object from memory and a fingerprint, is transmitted to a plurality of user devices. FIG. 35 shows an example of a delete instruction to delete an object in accordance with an embodiment. Delete instruction 3500 comprises object identification information 3510, which may comprise an identifier of the object to be deleted or information specifying the object's memory location, for example. Delete instruction 3500 also comprises a fingerprint 3520. In the illustrative embodiment, instruction 3500 is transmitted to user device 160-A, to user device 160-B, etc. Each user device 160 accordingly implements the instruction and deletes the word object "helloworld" from memory. Each user device 160 also generates a reverse delete instruction that corresponds to instruction 3500 and that contains the fingerprint associated with the instruction. The reverse delete instruction containing the fingerprint is added to the user device's respective undo stack. FIG. 36 shows an example of an undo stack 3600 that may be maintained by a user device 160 in accordance with an embodiment. Undo stack 3600 includes several reverse instructions 3611 and 3612. In this example, reverse instruction 3612 is a reverse delete instruction 3612 corresponding to delete instruction 3500. Reverse delete instruction comprises fingerprint 3520.

Suppose now that the user employing a user device, such as user device 160-A, wishes to undo the previous deletion and restore the word object instance 424 within document 410. The user selects one or more appropriate options to undo the prior deletion, as discussed above, and in response, user device 160-A transmits to collaborative development service 130 a request to undo the deletion. At step 3440, a second instruction to undo the first instruction is received from one of the plurality of user devices. Accordingly, the user's undo request is received by collaborative development service 130.

At step 3450, a third instruction to execute and remove any instruction that includes the fingerprint is transmitted to the plurality of user devices, in response to the second instruction. In response to the user's undo request, processor 375 determines that fingerprint 3520 is associated with the deletion, and transmits to each of user devices 160 an instruction to execute and remove any reverse instruction that includes fingerprint 3520. In response to the instruction, each user device examines its own respective undo stack and identifies any reverse instruction stored therein that includes fingerprint 3520. When a user device finds such a reverse instruction, the user device applies the reverse instruction to the data model and then removes the reverse instruction from the stack. In another embodiment, the instruction to execute and remove any reverse instruction may be attached to, or transmitted with, the user's undo request.

In another embodiment, when a user of a user device 160 generates an undo request to undo a deletion performed by a garbage collection routine, the user device itself determines the fingerprint associated with the deletion and transmits to other user devices an instruction to execute and remove any reverse instruction that includes the fingerprint.

In accordance with another embodiment, if a user device 160 receives from its current user a request to undo a deletion associated with a particular fingerprint, and, substantially simultaneously, receives either from collaborative development service 130 or from another user device an instruction to execute and remove any instruction associated with the same fingerprint, user device 160 applies an operational transformation rule to transform the instruction received remotely into a null command. As a result, user device 160 implements the local undo request only. This operational transformation rule ensures that any undo request that is submitted by two different users on two different devices is not performed twice and does not otherwise produce a conflict.

In one embodiment, the first instruction is received by collaborative development service 130 from the first user device in real-time. Specifically, for each alphanumeric character typed (or deleted) by the first user, the first user device transmits a respective instruction representing the addition/deletion of the character to collaborative development service 130. Similarly, the second instruction is received from the second user device in real-time. Specifically, for each alphanumeric character typed by the second user, the second user device transmits a respective instruction representing the character to collaborative development service 130. Collaborative development service 130 determines whether any operational transformations are necessary, performs operational transformations, and transmits instructions to the first and second user devices specifying the transformed operations in real-time relative to receipt of the first and second instructions.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of managing data storage among a plurality of user devices, the method comprising:
   identifying an object that is not linked to a root object of a data model;
   transmitting to a plurality of user devices a first instruction comprising a fingerprint and a request to delete the object from memory;
   deleting, at each of the plurality of user devices, the object;
   generating, at each of the plurality of user devices, a reverse instruction that contains the fingerprint;
   receiving, substantially simultaneously from each of two of the plurality of user devices, a second instruction to undo the first instruction; and
   in response to the second instruction, transmitting to the plurality of user devices a third instruction comprising the fingerprint and a request to execute and delete any instruction that includes the fingerprint.

2. The method of claim 1, further comprising: deleting the object from the data model.

3. The method of claim 1, wherein the identifying step and the transmitting step are performed while performing a background garbage collection function.

4. The method of claim 1, wherein the data model comprises an object constructed using one of a list, a map, and a primitive.

5. A non-transitory computer readable medium having program instructions stored thereon, the instructions capable of execution by a processor and defining the steps of:
   identifying an object that is not linked to a root object of a data model;
   transmitting to a plurality of user devices a first instruction comprising a fingerprint and a request to delete the object from memory;
   deleting, at each of the plurality of user devices, the object;
   generating, at each of the plurality of user devices, a reverse instruction that contains the fingerprint;
   receiving, substantially simultaneously from each of two of the plurality of user devices, a second instruction to undo the first instruction; and
   in response to the second instruction, transmitting to the plurality of user devices a third instruction comprising the fingerprint and a request to execute and delete any instruction that includes the fingerprint.

6. The non-transitory computer readable medium of claim 5, further comprising instructions defining the step of:
   deleting the object from the data model.

7. The non-transitory computer readable medium of claim 5, wherein the identifying step and the transmitting step are performed while performing a background garbage collection function.

8. The non-transitory computer readable medium of claim 5, wherein the data model comprises an object constructed using one of a list, a map, and a primitive.

* * * * *